United States Patent
Kume et al.

(10) Patent No.: US 12,077,694 B2
(45) Date of Patent: Sep. 3, 2024

(54) PRESSURE-SENSITIVE ADHESIVE SHEET FOR SURFACE PROTECTION

(71) Applicants: ARAKAWA CHEMICAL INDUSTRIES, LTD., Osaka (JP); NITTO DENKO CORPORATION, Ibaraki (JP)

(72) Inventors: Keita Kume, Osaka (JP); Yuki Hashimoto, Osaka (JP); Akihiro Yamazaki, Osaka (JP); Toru Higashimoto, Osaka (JP); Eiichi Imoto, Ibaraki (JP); Yoshio Nakagawa, Ibaraki (JP); Shota Tanaka, Ibaraki (JP); Kenichi Nishikawa, Ibaraki (JP); Chihiro Yoshida, Ibaraki (JP)

(73) Assignees: ARAKAWA CHEMICAL INDUSTRIES, LTD., Osaka (JP); NITTO DENKO CORPORATION, Ibaraki (JP)

( * ) Notice: Subject to any disclaimer, the term of this patent is extended or adjusted under 35 U.S.C. 154(b) by 701 days.

(21) Appl. No.: 17/277,362

(22) PCT Filed: Sep. 27, 2019

(86) PCT No.: PCT/JP2019/038335
§ 371 (c)(1),
(2) Date: Mar. 18, 2021

(87) PCT Pub. No.: WO2020/067494
PCT Pub. Date: Apr. 2, 2020

(65) Prior Publication Data
US 2022/0041900 A1    Feb. 10, 2022

(30) Foreign Application Priority Data
Sep. 28, 2018  (JP) .................. 2018-184772

(51) Int. Cl.
C09J 7/38     (2018.01)
C08F 220/14   (2006.01)
(Continued)

(52) U.S. Cl.
CPC ............ *C09J 7/385* (2018.01); *C08F 220/14* (2013.01); *C08F 220/1804* (2020.02);
(Continued)

(58) Field of Classification Search
CPC ........ C09J 7/385; C09J 7/29; C09J 2203/306; C09J 2203/35; C09J 2301/414;
(Continued)

(56) References Cited

U.S. PATENT DOCUMENTS

2011/0064946 A1  3/2011 Kai et al.
2013/0077135 A1  3/2013 Miyahara et al.
(Continued)

FOREIGN PATENT DOCUMENTS

CN    102027089 A    4/2011
CN    103019066 A    4/2013
(Continued)

OTHER PUBLICATIONS

Machine translation of JP4588573B2 (Year: 2023).*
(Continued)

*Primary Examiner* — Scott R. Walshon
(74) *Attorney, Agent, or Firm* — Sughrue Mion, PLLC

(57) ABSTRACT

A surface-protective PSA sheet capable of reducing adherend damage and well maintaining appearance, etc is provided. The surface-protective PSA sheet capable of reducing adherend damage and well maintaining appearance, etc., comprises a surface layer, a resin substrate layer and a PSA layer, and has a multilayer structure with the resin substrate layer placed between the surface layer and the PSA layer,
(Continued)

wherein the surface layer is a layer obtainable by curing a heat-curable composition comprising the following components:
(a) a hydroxyl group-containing (meth)acrylic copolymer having a glass transition temperature of −40° C. to 30° C.;
(b) an allophanate polyisocyanate and/or a biuret polyisocyanate; and
(c) a polysiloxane comprising a hydroxyl group-containing hydrocarbon group and/or polymer.

4 Claims, 1 Drawing Sheet

(51) Int. Cl.
| C08F 220/18 | (2006.01) |
| C08F 220/20 | (2006.01) |
| C08G 18/12 | (2006.01) |
| C08G 18/24 | (2006.01) |
| C08G 18/32 | (2006.01) |
| C08G 18/40 | (2006.01) |
| C08G 18/61 | (2006.01) |
| C08G 18/62 | (2006.01) |
| C08G 18/78 | (2006.01) |
| C08G 77/16 | (2006.01) |
| C09J 7/29 | (2018.01) |

(52) U.S. Cl.
CPC ............ *C08F 220/20* (2013.01); *C08G 18/12* (2013.01); *C08G 18/246* (2013.01); *C08G 18/3206* (2013.01); *C08G 18/4063* (2013.01); *C08G 18/61* (2013.01); *C08G 18/6254* (2013.01); *C08G 18/7831* (2013.01); *C08G 18/7837* (2013.01); *C08G 77/16* (2013.01); *C09J 7/29* (2018.01); C08G 2170/00 (2013.01); C09J 2203/306 (2013.01); C09J 2203/354 (2020.08); C09J 2301/162 (2020.08); C09J 2301/302 (2020.08); C09J 2301/414 (2020.08); C09J 2433/00 (2013.01); C09J 2475/00 (2013.01); C09J 2483/00 (2013.01)

(58) Field of Classification Search
CPC .. C09J 2433/00; C09J 2483/00; C08F 220/14; C08F 220/1804; C08F 220/20; C08G 18/3206; C08G 18/4063; C08G 18/61; C08G 18/6254; C08G 18/7831; C08G 18/7837; C08G 2170/00
See application file for complete search history.

(56) References Cited

U.S. PATENT DOCUMENTS

| 2013/0079460 A1 | 3/2013 | Miyahara et al. |
| 2015/0037590 A1 | 2/2015 | Groenewolt et al. |
| 2017/0342189 A1 | 11/2017 | Nakagawa et al. |
| 2021/0031497 A1* | 2/2021 | Simonis .................. B32B 27/34 |

FOREIGN PATENT DOCUMENTS

| CN | 103517931 A | | 1/2014 |
| CN | 107849397 A | | 3/2018 |
| JP | 2000-095836 A | | 4/2000 |
| JP | 2005-272558 A | | 10/2005 |
| JP | 2008-223034 A | | 9/2008 |
| JP | 2009-299053 A | | 12/2009 |
| JP | 4588573 B2 | * | 12/2010 |
| JP | 2012-107101 A | | 6/2012 |
| JP | 2013-131701 A | | 7/2013 |
| JP | 2013-244624 A | | 12/2013 |
| JP | 2014-019714 A | | 2/2014 |
| JP | 2015-038164 A | | 2/2015 |
| JP | 2017177742 A | * | 10/2017 |
| TW | 201819556 A | | 6/2018 |
| WO | 01/09261 A1 | | 2/2001 |
| WO | 2015/163286 A1 | | 10/2015 |
| WO | 2016/098771 A1 | | 6/2016 |
| WO | 2018/052008 A1 | | 3/2018 |

OTHER PUBLICATIONS

Machine translation of JP 2017-177742A (Year: 2023).*
Second Office Action dated Oct. 28, 2022 from The State Intellectual Property Office of People's Republic of China in Application No. 201980063802.8.
International search report for PCT/JP2019/038335 dated Dec. 10, 2019.
First Office Action dated Apr. 25, 2022, issued by the State Intellectual Property Office of People's Republic of China in Chinese Application No. 201980063802.8.
Notice of Reasons for Refusal dated May 18, 2023, issued in Japanese Application No. 2020-549472.
Request for the Submission of an Opinion dated Mar. 20, 2024 in Korean Application No. 10-2021-7012042.

* cited by examiner

PRESSURE-SENSITIVE ADHESIVE SHEET FOR SURFACE PROTECTION

CROSS-REFERENCE TO RELATED APPLICATIONS

This application is a National Stage of International Application No. PCT/JP2019/038335 filed Sep. 27, 2019, which claims priority under U.S.C. § 119(a) to Japanese Patent Application No. JP2018-184772 filed on Sep. 28, 2018.

TECHNICAL FIELD

The present invention relates to a pressure-sensitive adhesive (PSA) sheet for surface protection, in particular a surface-protective PSA sheet capable of reducing damage to articles caused by sorts of collision of flying objects and scratching, and maintaining their appearance and the like in good conditions.

BACKGROUND ART

Automobiles, construction equipment and the like can be hit by flying objects such as flying pebbles while running or operating. For instance, if a front windshield is directly hit, cracking may occur and develop further, requiring replacement of the entire front windshield. Damage to painted surface, resin parts, etc., are also important issues. For instance, many fingernail or key scratches are often found around door handle cups.

With respect to surface protection of automobiles, methods by applying PSA sheets have been reported. For instance, in a PSA sheet suggested for application on coated steel plates, its substrate has a Young's modulus in a specific range and the PSA sheet as a whole has stretching properties in specific ranges (see Patent Document 1). A highly weatherable PSA sheet suggested also for protecting coating film has a coating layer formed of a fluoroethylene-vinyl ether alternating copolymer having a specific structure (see Patent Document 2).

CITATION LIST

Patent Literature

[Patent Document 1] Japanese Patent Application Publication No. 2005-272558
[Patent Document 2] Japanese Patent Application Publication No. 2009-299053

SUMMARY OF INVENTION

Technical Problem

An objective of the present invention is to provide a surface-protective PSA sheet capable of reducing damage to adherends and maintaining their appearance and the like in good conditions.

Solution to Problem

As a result of earnest studies to solve the technical problem, the inventors have found that when a surface layer is formed of a specific layer comprising as the primary component a (meth)acrylic copolymer with various great properties and combined with a resin substrate layer and a PSA layer, the resulting surface-protective PSA sheet can bring about reduction of damage to adherends to well maintain their appearance, etc., leading to completion of the present invention.

In particular, an embodiment of this invention is described below.

<1-1> A surface-protective PSA sheet comprising a surface layer, a resin substrate layer and a PSA layer, and having a multilayer structure with the resin substrate layer placed between the surface layer and the PSA layer, wherein the surface layer is a layer obtainable by curing a heat-curable composition that comprises the following components:
  (a) a hydroxyl group-containing (meth)acrylic copolymer having a glass transition temperature of −40° C. to 30° C.;
  (b) an allophanate polyisocyanate and/or a biuret polyisocyanate; and
  (c) a polysiloxane comprising a hydroxyl group-containing hydrocarbon group and/or polymer.

<1-2> The surface-protective PSA sheet according to <1-1>, wherein the heat-curable composition further comprises the following component (d):
  (d) a diol having a hydroxyl value of 200 mgKOH/g or higher and a molecular weight of 500 or lower.

<1-3> The surface-protective PSA sheet according to <1-1> or <1-2>, wherein the resin substrate layer comprises a thermoplastic elastomer.

<1-4> The surface-protective PSA sheet according to any of <1-1> to <1-3>, wherein the (meth)acrylic copolymer has a glass transition temperature of −40° C. or higher and below −20° C.

<1-5> The surface-protective PSA sheet according to <1-4>, wherein the (meth)acrylic copolymer has a hydroxyl value of 10 mgKOH/g to 150 mgKOH/g based on non-volatiles.

<1-6> The surface-protective PSA sheet according to <1-4> or <1-5>, wherein the heat-curable composition has a component (a) to component (b) mass ratio (component (a)/component (b)) of 0.2 to 5.0.

<1-7> The surface-protective PSA sheet according to any of <1-1> to <1-3>, wherein the (meth)acrylic copolymer has a glass transition temperature of −20° C. to 30° C.

<1-8> The surface-protective PSA sheet according to <1-7>, wherein the (meth)acrylic copolymer has a hydroxyl value of 10 mgKOH/g to 150 mgKOH/g based on non-volatiles.

<1-9> The surface-protective PSA sheet according to <1-7> or <1-8>, wherein the heat-curable composition has a component (a) to component (b) mass ratio (component (a)/component (b)) of 0.2 to 5.0.

<1-10> The surface-protective PSA sheet according to any of <1-1> to <1-9>, wherein the thermoplastic elastomer is at least one species selected from the group consisting of thermoplastic polyurethane elastomers, thermoplastic polyester elastomers, thermoplastic polyamide elastomers, thermoplastic polyolefin elastomers, thermoplastic polystyrene elastomers, thermoplastic polyvinyl chloride elastomers and thermoplastic polybutadiene elastomers.

Another embodiment of this invention is as follows:

<2-1> A surface-protective PSA sheet comprising a surface layer, a resin substrate layer and a PSA layer, and having a multilayer structure with the resin substrate layer placed between the surface layer and the PSA layer, wherein
  the surface layer is a layer obtainable by curing a heat-curable composition that comprises a (meth)acrylic copolymer and a polyisocyanate, and the surface-protective PSA sheet having up to a 20% difference in haze value (ΔH=post-test haze value−pre-test haze value) before and after a Taber wear test according to JIS K7204:1999.

Advantageous Effects of Invention

According to this invention, damage to adherends can be reduced and their appearance and the like maintained in good conditions.

BRIEF DESCRIPTION OF DRAWINGS

FIG. 1(B) a cross section of a surface-protective PSA sheet comprising a surface layer, a surface-layer-side middle layer, a resin substrate layer and a PSA layer; FIG. 1(C) a cross section of a surface-protective PSA sheet comprising a surface layer, a resin substrate layer, a PSA-layer-side middle layer and a PSA layer; FIG. 1(D) a cross section of a surface-protective PSA sheet comprising a surface layer, a surface-layer-side middle layer, a resin substrate layer, a PSA-layer-side middle layer and a PSA layer).

DESCRIPTION OF EMBODIMENTS

Figure 1A:
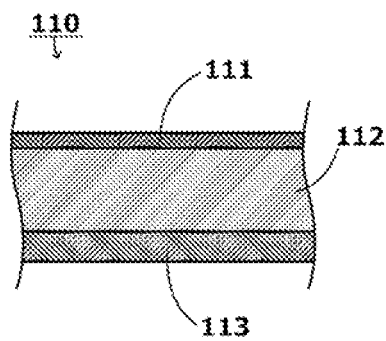
FIGS. 1(A)-1(D) show schematic diagrams illustrating cross sections of surface-protective PSA sheets as embodiments of this invention (FIG. 1(A) schematically illustrates a cross section of a surface-protective PSA sheet comprising a surface layer, a resin substrate layer and a PSA layer.

The present invention is described with specific examples, but not limited to what is described below while within the scope of this invention; and it can be implemented with suitable modifications.

A surface-protective PSA sheet as an embodiment of this invention (or abbreviated to a "surface-protective PSA sheet" hereinafter) comprises a surface layer (or abbreviated to a "surface layer" hereinafter), a resin substrate layer (or abbreviated to a "resin substrate layer" hereinafter) and a pressure-sensitive adhesive layer (or abbreviated to a "PSA layer" hereinafter), and has a multilayer structure with the resin substrate layer placed between the surface layer and the PSA layer, the surface-protective PSA sheet characterized by the surface layer being obtainable by curing a heat-curable composition that comprises the following components (or abbreviated to a "heat-curable composition" hereinafter):
  (a) a hydroxyl group-containing (meth)acrylic copolymer having a glass transition temperature of −40° C. to 30° C. (or abbreviated to a "component (a)" hereinafter);
  (b) an allophanate polyisocyanate and/or a biuret polyisocyanate (or abbreviated to a "component (b)" hereinafter); and
  (c) a polysiloxane comprising a hydroxyl group-containing hydrocarbon group and/or polymer (or abbreviated to a "component (c)" hereinafter).

As a result of earnest studies on surface-protective PSA sheets, the inventors have found that when a surface layer is formed of a specific layer comprising as the primary component a (meth)acrylic copolymer with various great properties and combined with a resin substrate layer and a PSA layer, the resulting surface-protective PSA sheet can bring about reduction of damage to adherends to well maintain their appearance, etc. The resin substrate layer and the PSA layer provide not only support and adhesiveness, but also suitable elasticity to the surface-protective PSA sheet, thereby serving to absorb impact of flying objects and aid the surface layer's wear resistance (self-repairing properties, etc.). In other words, when the surface layer comprising a (meth)acrylic copolymer as the primary component and having wear-resistance (self-repairing properties, etc.) is combined with the resin substrate layer and the PSA layer, the resulting surface-protective PSA sheet excels especially in its capability to well maintain appearance, etc.

It is noted that the term "(meth)acrylic" as in "(meth) acrylic copolymer" comprehensively means both methacrylic and acrylic.

Described below in detail are the shapes, physical properties, etc., of the "surface layer," the "resin substrate layer," the "PSA layer" and the "surface-protective PSA sheet."
<Surface Layer>

The surface layer is obtainable by curing a heat-curable composition comprising components (a) to (c). The "component (a)," "component (b)" or "component (c)" is not particularly limited to specific species. Known species can be suitably used.

Described below in detail are the "component (a)," "component (b)," "component (c)," etc.
(Component (a))

The component (a) is a "hydroxyl group-containing (meth)acrylic copolymer having a glass transition temperature of −40° C. to 30° C.". The "(meth)acrylic copolymer" refers to a copolymer that comprises, as a constituent, at least one structure selected from the group consisting of a structure formed by addition polymerization from a (meth) acrylic acid ester represented by formula (x) below (or a structure represented by formula (X) below), a structure formed by addition polymerization from a (meth)acrylamide represented by formula (y) below (or a structure represented by formula (Y) below) and a structure formed by addition polymerization from (meth)acrylic acid; a copolymer that comprises, as a constituent, a structure resulting from modification (esterification or amidation) of (meth)acrylic acid or a (meth)acrylic acid-derived carboxyl group with a hydroxyl group-containing compound such as polyglycerin and polyalkylene glycol or with an amino group-containing compound; or a copolymer that comprises, as a constituent, a structure resulting from modification of a (meth)acrylic acid ester or a (meth)acrylamide-derived functional group with a compound reactive therewith. It is noted that the component (a) is not limited to a species consisting of one kind of (meth)acrylic copolymer and it may include two or more kinds of (meth)acrylic copolymers.

[Chem 1]

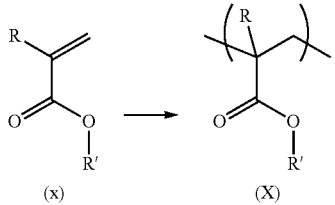

(In formulas (x) and (X), R is independently a hydrogen atom or a methyl group; and R' is independently a hydrocarbon group having 1 to 30 carbon atoms and possibly including at least one functional group selected from the group consisting of a hydroxyl group, carboxyl group, oxa group, glycidyl group, carbonyl group, oxycarbonyl group, carbonate group, amino group, amide group, cyano group, trialkoxysilyl group, fluoro group, chloro group, bromo group and iodo group.)

[Chem 2]

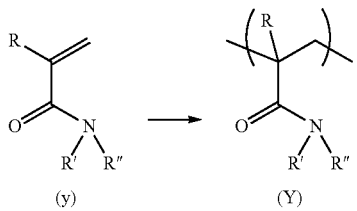

(In formulas (y) and (Y), R is independently a hydrogen atom or a methyl group; R' is independently a hydrocarbon group having 1 to 30 carbon atoms and possibly including at least one functional group selected from the group consisting of a hydroxyl group, carboxyl group, oxa group, glycidyl group, carbonyl group, oxycarbonyl group, carbonate group, amino group, amide group, cyano group, trialkoxysilyl group, fluoro group, chloro group, bromo group and iodo group; and R" is independently a hydrogen atom or a hydrocarbon group having 1 to 30 carbon atoms and possibly including at least one functional group selected from the group consisting of a hydroxyl group, carboxyl group, oxa group, glycidyl group, carbonyl group, oxycarbonyl group, amino group, amide group, cyano group, trialkoxysilyl group, fluoro group, chloro group, bromo group and iodo group.)

"Possibly including at least one functional group selected from the group consisting of a hydroxyl group, . . . " means that a hydrogen atom of the hydrocarbon group may be substituted with a monovalent functional group such as a hydroxyl group as in —CH$_2$CH$_2$OH and that a carbon atom (methylene group) of the hydrocarbon group may be substituted with a divalent or higher valent functional group such as an oxa group as in —CH$_2$OCH$_3$.

The "hydrocarbon group" is not limited to a linear saturated hydrocarbon group and the term is meant to possibly include a branched structure, cyclic structure and unsaturated carbon-carbon bond (carbon-carbon double bond, carbon-carbon triple bond), encompassing an unsaturated hydrocarbon group and an aromatic hydrocarbon group.

The (meth)acrylic acid esters represented by formula (x) and the (meth)acrylamides represented by formula (y) include the compounds represented by the formulas shown below (the chemical formulas of acrylic acid and methacrylic acid are also shown although they are neither (meth)acrylic acid esters represented by formula (x) nor (meth)acrylamides represented by formula (y)). It is noted that the compounds represented by the following formulas are commercially available and can be suitably obtained and included as constituents of the (meth)acrylic copolymer.

[Chem 3]

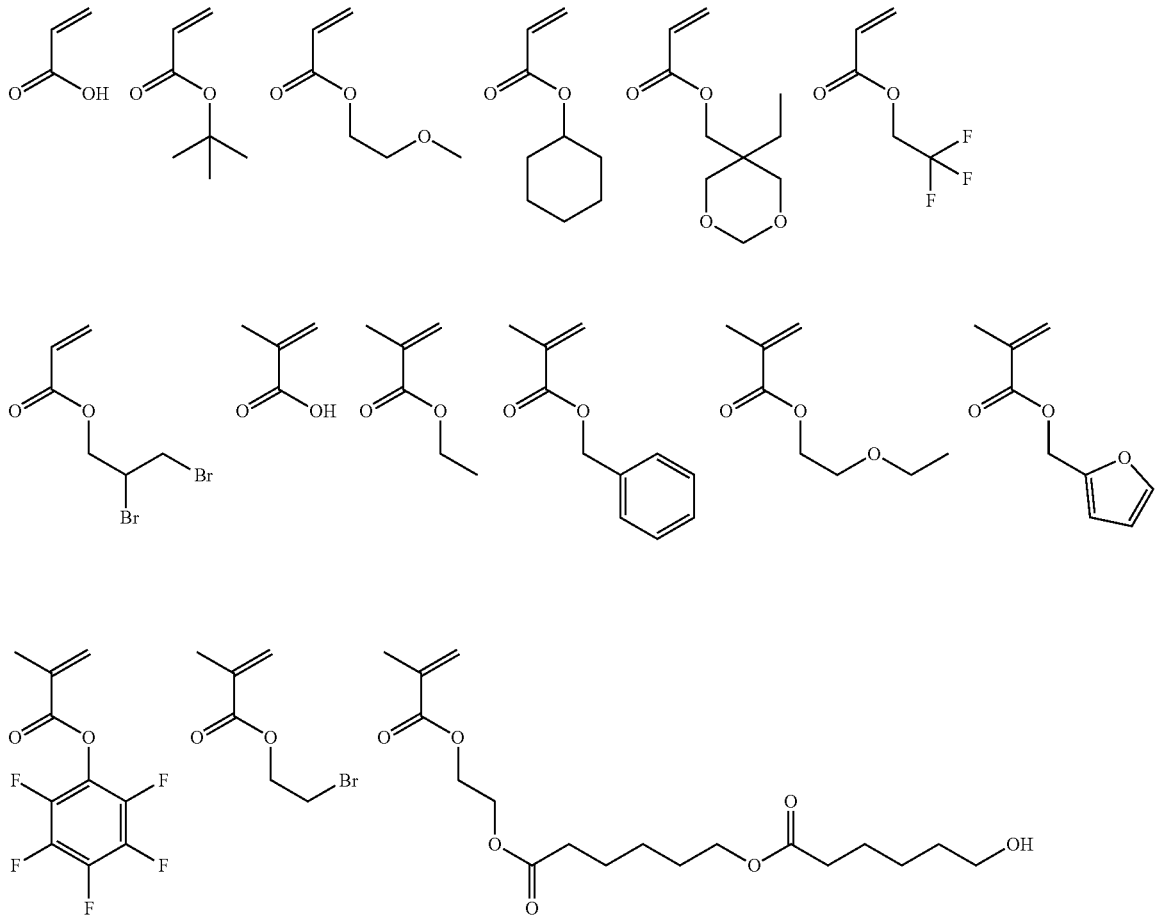

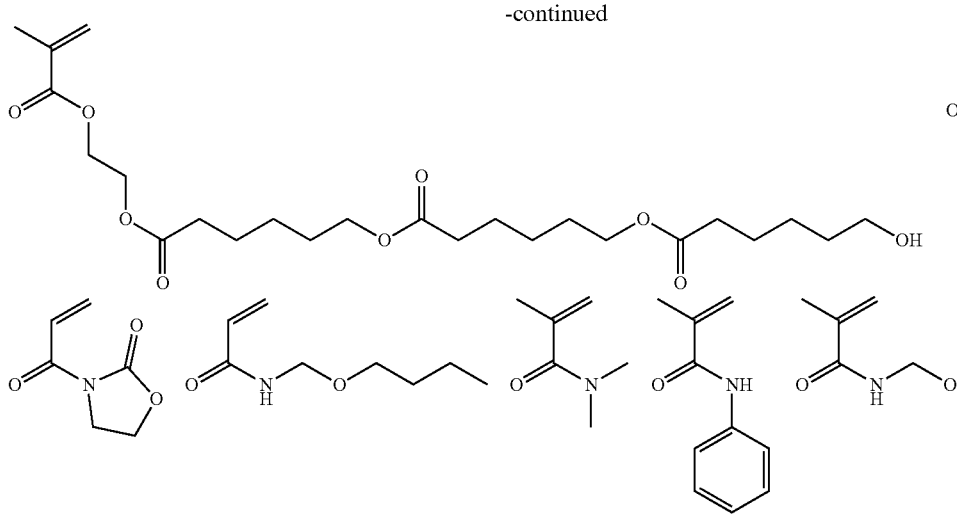

The (meth)acrylic copolymer may include other structure(s) besides the structure derived from a (meth)acrylic acid ester represented by formula (x) (or "other non-(meth)acrylate (x)-derived structure(s)" hereinafter). Examples of the other non-(meth)acrylate (x)-derived structure(s) include a structure derived from an addition-polymerizable monomer having an unsaturated carbon-carbon bond capable of forming a copolymer by addition polymerization with a (meth)acrylic acid ester represented by formula (x), etc. Examples of the addition-polymerizable monomer having an unsaturated carbon-carbon bond include vinyl compounds such as vinyl chloride; styrene compounds such as styrene; and cyclic olefinic compounds such as cyclohexene.

With respect to the at least one structure selected from the group consisting of structures derived from the (meth)acrylic acid esters represented by formula (x) and structures derived from the (meth)acrylamides represented by formula (y), the total content as a constituent in the (meth)acrylic copolymer (the mass of the monomer added when synthesizing the (meth)acrylic copolymer (the percent mass with the total mass of all monomers included being 100% by mass) is typically 50% to 100% by mass. Preferable lower limits include 55%, 60%, 65%, 70%, 75%, 80%, 85%, 90% and 95% by mass. Preferable upper limits include 95%, 90%, 85%, 80%, 75%, 70%, 65%, 60% and 55% by mass. In these ranges, preparation of the component (a) is facilitated.

The component (a) is a "hydroxyl group-containing (meth)acrylic copolymer having a glass transition temperature of −40° C. to 30° C." As used herein, the "glass transition temperature" means the theoretical value calculated by the Fox equation shown below. For a homopolymer whose glass transition temperature (or abbreviated to "$Tg_{HP}$" hereinafter) is specifically given herein, the given $Tg_{HP}$ value is used. For a homopolymer unspecified herein, an actual measurement value determined by differential scanning calorimetry (DSC, temperature raised at 1° C./min) is used.

$$100/Tg = (W_1/Tg_{HP1}) + (W_2/Tg_{HP2}) + \ldots + (W_n/Tg_{HPn})$$ Fox equation:

Tg: glass transition temperature (K) of (meth)acrylic copolymer
$W_1$: amount of monomer 1 (mass added, % by mass)
$Tg_{HP1}$: glass transition temperature (K) of homopolymer of monomer 1
$W_2$: amount of monomer 2 (mass added, % by mass)
$Tg_{HP2}$: glass transition temperature (K) of homopolymer of monomer 1
$W_n$: amount of monomer n (mass added, % by mass)
$Tg_{HPn}$: glass transition temperature (K) of homopolymer of monomer n Because the component (a) is a "hydroxyl group-containing (meth)acrylic copolymer having a glass transition temperature of −40° C. to 30° C.," it should include a structure having a hydroxyl group (or abbreviated to a "hydroxyl group-containing structure" hereinafter). One such hydroxyl group-containing structure is a structure derived from a (meth)acrylic acid ester represented by formula (x1) shown below.

[Chem 4]

(x1)

(In formula (x1), R is a hydrogen atom or a methyl group; and $R^1$ is a hydroxyl group-containing hydrocarbon group having 1 to 30 carbon atoms and possibly including at least one functional group selected from the group consisting of an oxa group, carbonyl group, oxycarbonyl group and carbonate group.)

The "hydroxyl group" in formula (x1) does not include the hydroxyl groups in a carboxyl group, sulfo group, etc. As described above, "possibly including at least one functional group selected from the group consisting of an oxa group, carbonyl group, oxycarbonyl group and carbonate group" means that a carbon atom (methylene group) of the hydrocarbon group can be substituted with an oxa group (—O—), carbonyl group (>C═O), oxycarbonyl group (—O(C═O)—), carbonate group (—O(C═O)O—), etc. The "hydrocarbon group" may include a branched structure, cyclic structure and unsaturated carbon-carbon bond (carbon-carbon double bond, carbon-carbon triple bond) as described above.

The number of carbon atoms in $R^1$ of formula (x1) is 1 to 30, for instance, 1 to 20, with 2 being a preferable lower limit. Preferable upper limits include 28, 26, 24, 22, 20, 18, 16, 14, 12, 10, 8 and 6.

The (meth)acrylic acid esters represented by formula (x1) include the compounds represented by the formulas shown below. It is noted that the compounds represented by the following formulas are commercially available and can be suitably obtained and included as constituents of the (meth)acrylic copolymer.

Examples of structures other than hydroxyl group-containing structures include a structure derived from an addition-polymerizable monomer free of a hydroxyl group (or a hydroxyl-free addition-polymerizable monomer). Hydroxyl-free addition-polymerizable monomers can be classified by $Tg_{HP}$ (homopolymer glass transition temperature) as (1) below $-40°$ C., (2) $-40°$ C. or higher and below $-20°$ C., (3) $-20°$ C. or higher and below $0°$ C., and (4) $0°$ C. or higher. Examples of hydroxyl-free addition-polymerizable monomers include the (meth)acrylic acid esters represented by formula (x2) shown below.

[Chem 5]

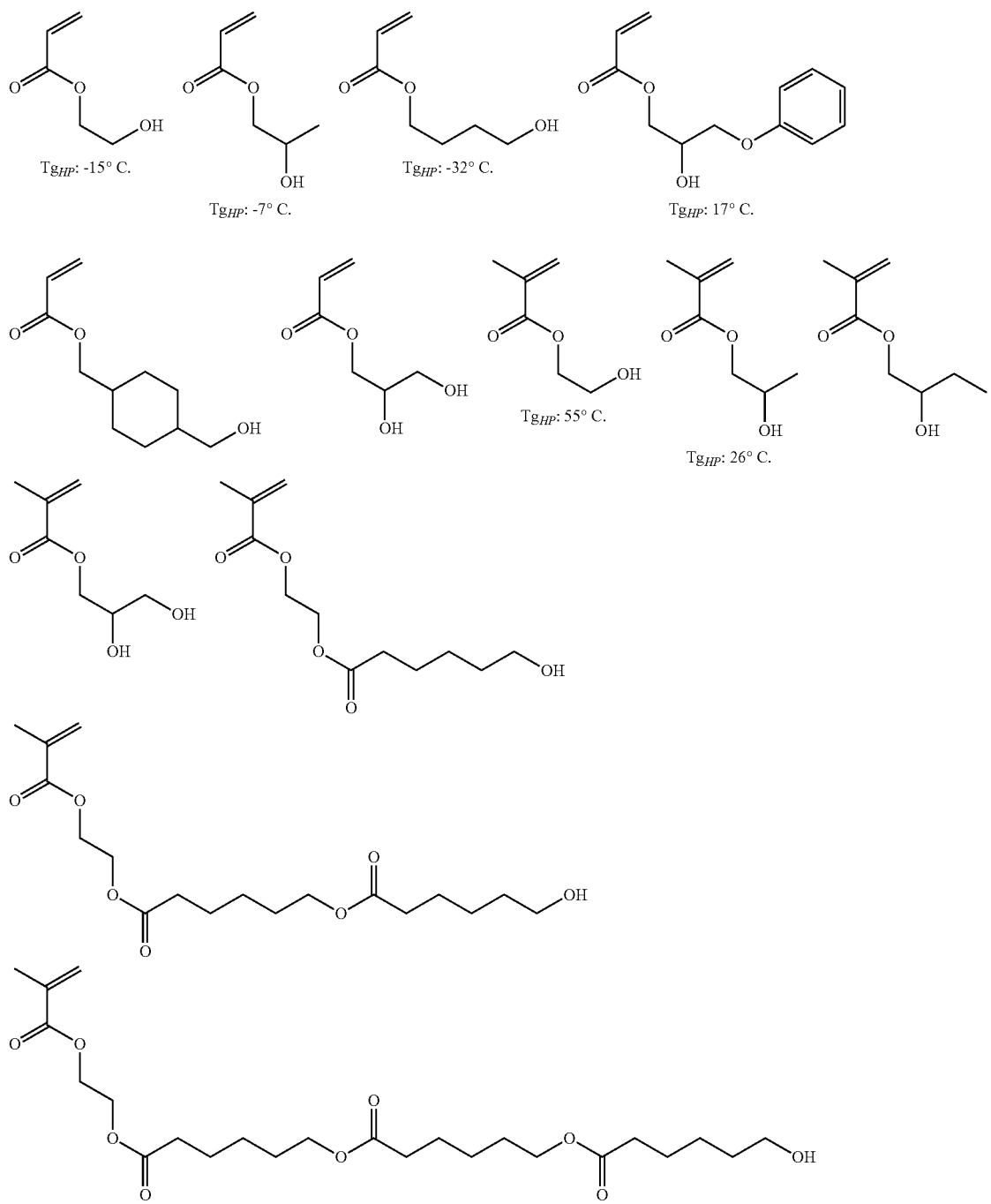

[Chem 6]

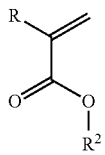
(x2)

(In formula (x2), R is a hydrogen atom or a methyl group; and $R^2$ is a hydrocarbon group having 1 to 30 carbon atoms and possibly including at least one functional group selected from the group consisting of an oxa group, carbonyl group, oxycarbonyl group and carbonate group.)

As described above, "possibly including at least one functional group selected from the group consisting of an oxa group, carbonyl group, oxycarbonyl group and carbonate group" means that a carbon atom (methylene group) of the hydrocarbon group can be substituted with an oxa group (—O—), carbonyl group (>C=O), oxycarbonyl group (—O(C=O)—), carbonate group (—O(C=O)O—), etc. The "hydrocarbon group" may include a branched structure, cyclic structure and unsaturated carbon-carbon bond (carbon-carbon double bond, carbon-carbon triple bond) as described above.

The number of carbon atoms in $R^2$ of formula (x2) is 1 to 30, with 2 being a preferable lower limit. Preferable upper limits include 28, 26, 24, 22, 20, 18, 16, 14, 12, 10, 8 and 6.

The $Tg_{HP}$ value of a (meth)acrylic acid ester represented by formula (x2) tends to depend on R and the number of carbon atoms in $R^2$. Methacrylic acid esters with R being methyl groups tend to have higher $Tg_{HP}$ than acrylic acid esters with R being hydrogen atoms. The higher the number of carbon atoms in $R^2$ is, the lower the $Tg_{HP}$ tends to be; however, above a certain number of carbon atoms in $R^2$, the properties of $R^2$ tends to become dominant, leading to a higher $Tg_{HP}$. In other words, when the hydroxy-group-free addition-polymerizable monomer is a (meth)acrylic acid ester represented by formula (x2), for instance, the $Tg_{HP}$ of the (meth)acrylic acid ester represented by formula (x2) is easily controlled by selecting the number of carbon atoms in the alcohol that undergoes reaction (esterification) with acrylic acid; and eventually, the glass transition temperature of the (meth)acrylic copolymer will be easily controlled.

The (meth)acrylic acid esters with $Tg_{HP}$ below −40° C. represented by formula (x2) include the compounds represented by the formulas shown below. It is noted that the compounds represented by the following formulas are commercially available, and can be suitably obtained and included as constituents of the (meth)acrylic copolymer.

[Chem 7]

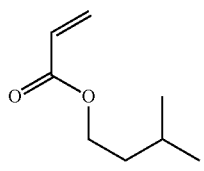

$Tg_{HP}$: -45° C.

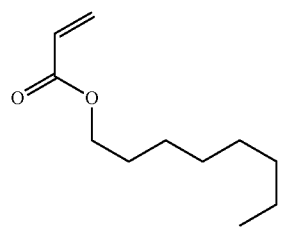

$Tg_{HP}$: -65° C.

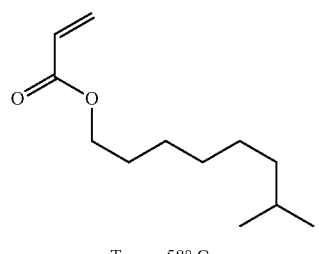

$Tg_{HP}$: -58° C.

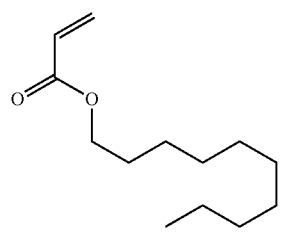

$Tg_{HP}$: -62° C.

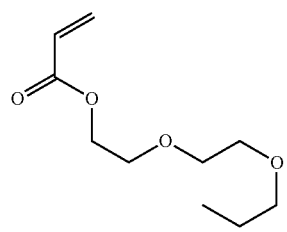

$Tg_{HP}$: -70° C.

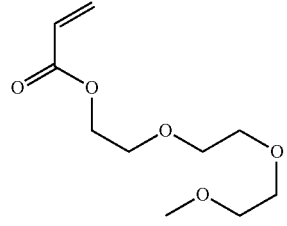

$Tg_{HP}$: -50° C.

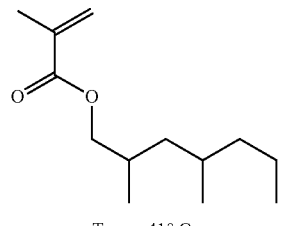

$Tg_{HP}$: -41° C.

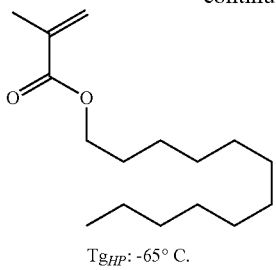

Tg$_{HP}$: −65° C.

The (meth)acrylic acid esters with Tg$_{HP}$ at −40° C. or higher below −20° C. represented by formula (x2) include the compounds represented by the formulas shown below. It is noted that the compounds represented by the following formulas are commercially available, and can be suitably obtained and included as constituents of the (meth)acrylic copolymer.

[Chem 8]

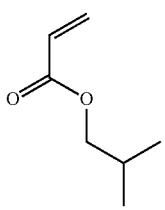

Tg$_{HP}$: −26° C.

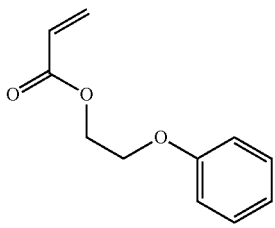

Tg$_{HP}$: −22° C.

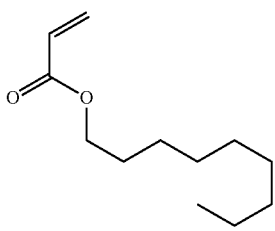

Tg$_{HP}$: −37° C.

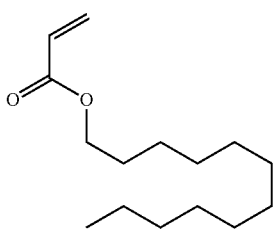

Tg$_{HP}$: −23° C.

The (meth)acrylic acid esters with Tg$_{HP}$ at −20° C. or higher below 0° C. represented by formula (x2) include the compounds represented by the formulas shown below. It is noted that the compounds represented by the following formulas are commercially available, and can be suitably obtained and included as constituents of the (meth)acrylic copolymer.

[Chem 9]

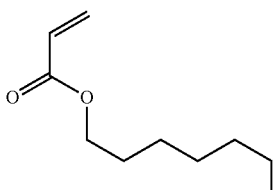

Tg$_{HP}$: −3° C.

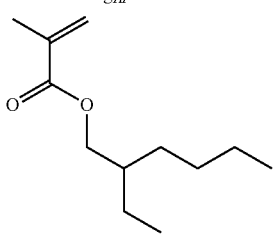

Tg$_{HP}$: −10° C.

The (meth)acrylic acid esters with Tg$_{HP}$ at 0° C. or higher represented by formula (x2) include the compounds represented by the formulas shown below. It is noted that the compounds represented by the following formulas are commercially available, and can be suitably obtained and included as constituents of the (meth)acrylic copolymer.

[Chem 10]

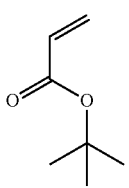

Tg$_{HP}$: 14° C.

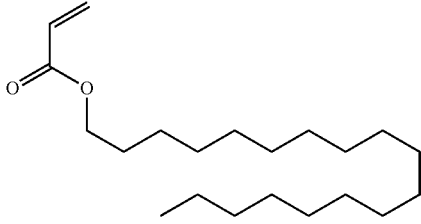

Tg$_{HP}$: 30° C.

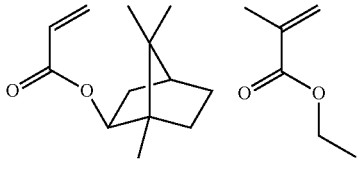

Tg$_{HP}$: 94° C.   Tg$_{HP}$: 65° C.

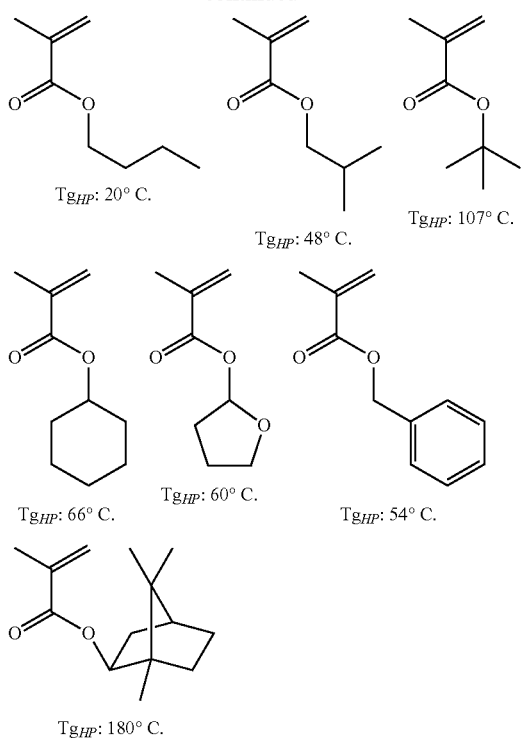

For the polymerization method and polymerization conditions for producing the (meth)acrylic copolymer, known polymerization methods and polymerization conditions can be suitably employed, such as solution polymerization, bulk polymerization, suspension polymerization and emulsion polymerization.

Examples of polymerization initiators include azo polymerization initiators as those represented by the formulas shown below. It is noted that the compounds represented by the following formulas are commercially available, and can be suitably obtained and used in producing the (meth)acrylic copolymer.

[Chem 11]

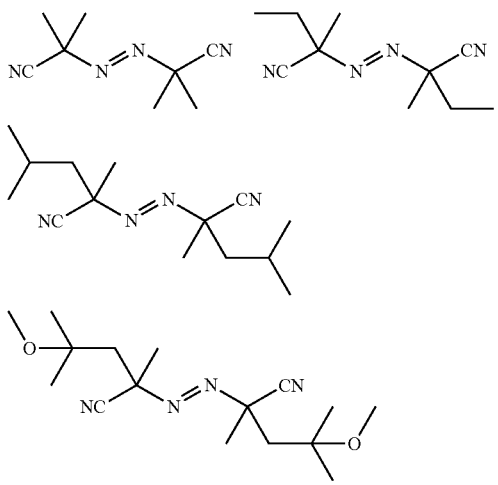

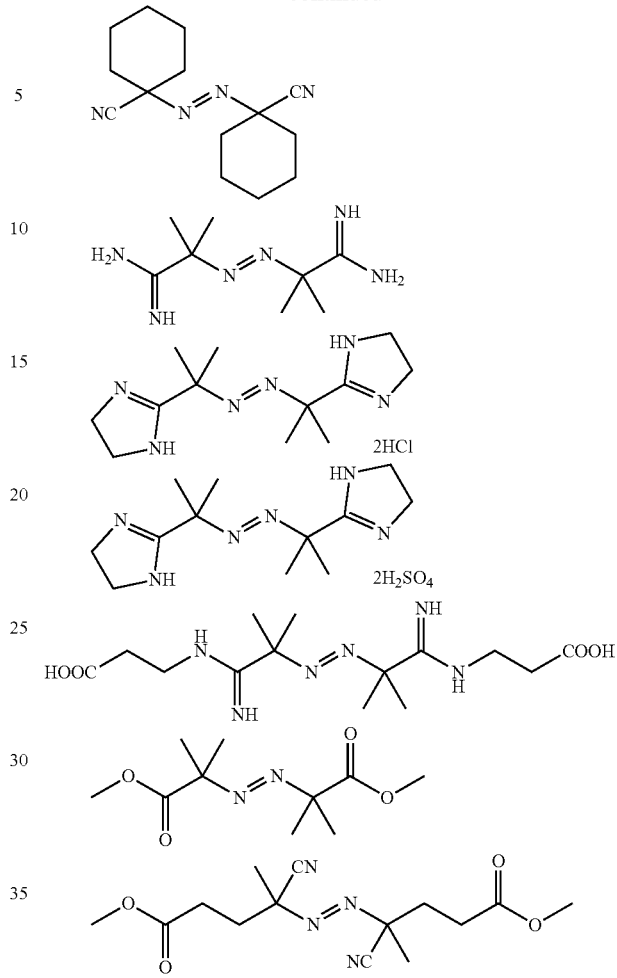

The component (a) is subject to no particular limitations other than being a "hydroxyl group-containing (meth)acrylic copolymer having a glass transition temperature of −40° C. to 30° C. The glass transition temperature, hydroxyl value, hydroxyl equivalent, acid value, hydroxyl group-containing structure content and so on are described in detail, separately for "hydroxyl group-containing (meth)acrylic copolymers with glass transition temperatures at −40° C. or higher and below −20° C." (or abbreviated to "components (a1)" hereinafter) and for "hydroxyl group-containing (meth)acrylic copolymers with glass transition temperatures at −20° C. or higher and 30° C. or lower (or abbreviated to "components (a2)" hereinafter).

(Component (a1))

The glass transition temperature of component (a1) is −40° C. or higher and below −20° C. Preferable lower limits include −38, −36, −34, −32, −30, −28, −26, −24 and −22 (all in ° C.) and preferable upper limits include −22, −24, −26, −28, −30, −32, −34, −36 and −38 (all in ° C.). Within these ranges, excellent self-repairing properties, wear resistance, coating appearance, pot life, etc., are obtained.

Based on non-volatiles, the component (a1) typically has a hydroxyl value of 10 mgKOH/g to 150 mgKOH/g. Preferable lower limits include 15, 20, 30, 40, 50, 60, 70, 80, 90, 100, 110, 120, 130 and 140 (all in mgKOH/g). Preferable upper limits include 140, 130, 120, 110, 100, 90, 80, 70, 60, 50, 40, 30, 20 and 15 (all in mgKOH/g). Within these ranges, excellent self-repairing properties, wear resistance, coating appearance, pot life, etc., are obtained. The hydroxyl value is a value determined by measurement according to JIS K 1557-1:2007 (schemed based on ISO 14900:2001).

The component (a1) typically has a hydroxyl equivalent of 0.17 meg/g to 2.7 meg/g. Preferable lower limits include 0.25, 0.5, 1.0, 1.5, 1.8, 2.0 and 2.5 (all in meq/g). Preferable upper limits include 2.5, 2.0, 1.8, 1.5, 1.0, 0.5 and 0.25 (all in meq/g). Within these ranges, excellent self-repairing properties, wear resistance, coating appearance, pot life, etc., are obtained. The hydroxyl equivalent refers to the amount of hydroxyl groups present in one gram of non-volatiles.

The component (a1) typically has an acid value of 0 to 10 mgKOH/g. Preferable lower limits include 0.1, 1.0 and 5.0 (all in mgKOH/g). Preferable upper limits include 5.0, 1.0 and 0.1 (all in mgKOH/g). Within these ranges, excellent curing properties are obtained. The acid value is a value determined by measurement according to JIS K 0070-1: 1992.

The total amount of the hydroxyl group-containing structure as a constituent in the component (a1) (the mass of the monomer added when synthesizing the (meth)acrylic copolymer (the percent mass with the total mass of monomers added being 100% by mass)) is typically 2.0% to 35% by mass. Preferable lower limits include 2.5, 5.0, 10, 15, 25 and 30 (all in % by mass). Preferable upper limits include 30, 25, 20, 15, 10, 5.0 and 2.5 (all in % by mass). Within these ranges, excellent self-repairing properties, wear resistance, coating appearance, pot life, etc., are obtained.

The total amount of the hydroxyl group-containing structure as a constituent in the component (a1) (the mass of the monomer added when synthesizing the (meth)acrylic copolymer (the mole percent of the monomer added when synthesizing the (meth)acrylic copolymer with the total mass of monomers added being 100% by mole)) is typically 1.5% to 38% by mole. Preferable lower limits include 2.5, 5.0, 10, 15, 25, 30 and 35 (all in % by mole). Preferable upper limits include 30, 25, 20, 15, 10, 5.0 and 2.5 (all in % by mole). Within these ranges, excellent self-repairing properties, wear resistance, coating appearance, pot life, etc., are obtained.

In the component (a1), the total amount of the structure (as a constituent) derived from the hydroxyl-free addition-polymerizable monomer having a $Tg_{HP}$ of below −40° C. or of −40° C. or higher and below −20° C. (the amount of the monomer added when synthesizing the (meth)acrylic copolymer (the percent mass with the total mass of monomers added being 100% by mass)) is typically 2.0% to 70% by mass. Preferable lower limits include 2.5, 5.0, 10, 15, 25, 30, 35, 40, 45 and 50 (all in % by mass). Preferable upper limits include 65, 60, 55, 50, 45, 40, 35, 30, 25, 20, 15 and 10 (all in % by mass). Within these ranges, excellent self-repairing properties, wear resistance, coating appearance, pot life, etc., are obtained.

In the component (a1), the total amount of the structure (as a constituent) derived from the hydroxyl-free addition-polymerizable monomer having a $Tg_{HP}$ of −20° C. or higher and below 0° C. or of 0° C. or higher (the amount of the monomer added when synthesizing the (meth)acrylic copolymer (the percent mass with the total mass of monomers added being 100% by mass)) is typically 2.0% to 70% by mass. Preferable lower limits include 2.5, 5.0, 10, 15, 25, 30, 35, 40, 45 and 50 (all in % by mass). Preferable upper limits include 65, 60, 55, 50, 45, 40, 35, 30, 25, 20, 15 and 10 (all in % by mass). Within these ranges, excellent self-repairing properties, wear resistance, coating appearance, pot life, etc., are obtained.

The component (a1) typically has a weight average molecular weight (Mw) of 10,000 to 300,000. Preferable lower limits include 20,000, 30,000, 40,000, 50,000, 60,000, 70,000, 80,000, 90,000, 100,000 and 200,000. Preferable upper limits include 200,000, 100,000, 90,000, 80,000, 70,000, 60,000, 50,000, 40,000, 30,000 and 20,000. Within these ranges, excellent self-repairing properties, wear resistance, tensile properties, dirt resistance, etc., are obtained.

The component (a1) typically has a number average molecular weight (Mn) of 5,000 to 100,000. Preferable lower limits include 5,000, 10,000, 20,000, 30,000, 40,000, 50,000, 60,000, 70,000, 80,000 and 90,000. Preferable upper limits include 90,000, 80,000, 70,000, 60,000, 50,000, 40,000, 30,000, 20,000 and 10,000. Within these ranges, excellent self-repairing properties, wear resistance, tensile properties, dirt resistance, etc., are obtained.

The component (a1) typically has a molecular weight distribution (or dispersity; Mw/Mn) of 1.5 to 10. Preferable lower limits include 2.0, 2.5, 5.0, 7.5 and 9.5. Preferable upper limits include 7.5, 5.0, 2.5 and 2.0. Within these ranges, excellent self-repairing properties, wear resistance, tensile properties, dirt resistance, etc., are obtained.

The total component (a1) content (based on non-volatiles) of the heat-curable composition is typically 10% to 90% by mass. Preferable lower limits include 10, 20, 30, 40, 50, 60, 70 and 80 (all in % by mass). Preferable upper limits include 80, 70, 60, 50, 40, 30 and 20 (all in % by mass). Within these ranges, excellent self-repairing properties, wear resistance, tensile properties, dirt resistance, etc., are obtained.

(Component (a2))

The component (a2) has a glass transition temperature of −20° C. or higher and 30° C. or lower. Preferable lower limits include −18, −16, −14, −12, −10, −8, −6, −4 and −2 (all in ° C.). Preferable upper limits include 28, 26, 24, 22, 20, 18, 16, 14, 12, 10, 8, 6, 4 and 2 (all in ° C.). Within these ranges, excellent self-repairing properties, wear resistance, coating appearance, pot life, etc., are obtained.

Based on non-volatiles, the component (a2) typically has a hydroxyl value of 40 mgKOH/g to 100 mgKOH/g. Preferable lower limits include 45, 50, 55, 60, 65, 70, 75, 80, 85, 90 and 95 (all in mgKOH/g). Preferable upper limits include 95, 90, 85, 80, 75, 70, 65, 60, 55, 50, 45 and 40 (all in mgKOH/g). Within these ranges, excellent self-repairing properties, wear resistance, coating appearance, pot life, etc., are obtained.

The total amount of the hydroxyl group-containing structure as a constituent in the component (a2) (the mass of the monomer added when synthesizing the (meth)acrylic copolymer (the percent mass with the total mass of monomers added being 100% by mass)) is typically 2.0% to 35% by mass. Preferable lower limits include 2.5, 5.0, 10, 15, 25 and 30 (all in % by mass). Preferable upper limits include 30, 25, 20, 15, 10, 5.0 and 2.5 (all in % by mass). Within these ranges, excellent self-repairing properties, wear resistance, coating appearance, pot life, etc., are obtained.

The total amount of the hydroxyl group-containing structure as a constituent in the component (a2) (the mass of the monomer added when synthesizing the (meth)acrylic copolymer (the percent mass with the total mass of monomers added being 100% by mass)) is typically 2.0% to 35% by mass. Preferable lower limits include 2.5, 5.0, 10, 15, 25 and 30 (all in % by mass). Preferable upper limits include 30, 25, 20, 15, 10, 5.0 and 2.5 (all in % by mass). Within these ranges, excellent self-repairing properties, wear resistance, coating appearance, pot life, etc., are obtained.

The total amount of the hydroxyl group-containing structure as a constituent in the component (a2) (the mass of the monomer added when synthesizing the (meth)acrylic copolymer (the mole percent of the monomer added when synthesizing the (meth)acrylic copolymer with the total mass of monomers added being 100% by mole)) is typically 1.5% to 38% by mole. Preferable lower limits include 2.5, 5.0, 10, 15, 25, 30 and 35 (all in % by mole). Preferable upper limits include 30, 25, 20, 15, 10, 5.0 and 2.5 (all in % by mole). Within these ranges, excellent self-repairing properties, wear resistance, coating appearance, pot life, etc., are obtained.

In the component (a2), the total amount of the structure (as a constituent) derived from the hydroxyl-free addition-polymerizable monomer having a $Tg_{HP}$ of below −40° C., of −40° C. or higher and below −20° C. or of −20° C. or higher (the amount of the monomer added when synthesizing the (meth)acrylic copolymer (the percent mass with the total mass of monomers added being 100% by mass)) is typically 2.0% to 70% by mass. Preferable lower limits include 2.5, 5.0, 10, 15, 25, 30, 35, 40, 45 and 50 (all in % by mass). Preferable upper limits include 65, 60, 55, 50, 45, 40, 35, 30, 25, 20, 15 and 10 (all in % by mass). Within these ranges, excellent self-repairing properties, wear resistance, coating appearance, pot life, etc., are obtained.

In the component (a2), the total amount of the structure (as a constituent) derived from the hydroxyl-free addition-polymerizable monomer having a $Tg_{HP}$ of 0° C. or higher (the amount of the monomer added when synthesizing the (meth)acrylic copolymer (the percent mass with the total mass of monomers added being 100% by mass)) is typically 2.0% to 70% by mass. Preferable lower limits include 2.5, 5.0, 10, 15, 25, 30, 35, 40, 45 and 50 (all in % by mass). Preferable upper limits include 65, 60, 55, 50, 45, 40, 35, 30, 25, 20, 15 and 10 (all in % by mass). Within these ranges, excellent self-repairing properties, wear resistance, coating appearance, pot life, etc., are obtained.

The component (a2) typically has a weight average molecular weight (Mw) of 10,000 to 500,000. Preferable lower limits include 20,000, 30,000, 40,000, 50,000, 60,000, 70,000, 80,000, 90,000, 100,000, 200,000, 300,000 and 400,000. Preferable upper limits include 400,000, 300,000, 200,000, 100,000, 90,000, 80,000, 70,000, 60,000, 50,000, 40,000, 30,000 and 20,000. Within these ranges, excellent self-repairing properties, wear resistance, tensile properties, dirt resistance, etc., are obtained.

The component (a2) typically has a number average molecular weight (Mn) of 6,000 to 150,000. Preferable lower limits include 8,000, 10,000, 20,000, 30,000, 40,000, 50,000, 60,000, 70,000, 80,000, 90,000, 100,000 and 120,000. Preferable upper limits include 120,000, 100,000, 90,000, 80,000, 70,000, 60,000, 50,000, 40,000, 30,000, 20,000 and 10,000. Within these ranges, excellent self-repairing properties, wear resistance, tensile properties, dirt resistance, etc., are obtained.

The component (a2) typically has a molecular weight distribution (or dispersity; Mw/Mn) of 1.5 to 10. Preferable lower limits include 2.0, 2.5, 5.0, 7.5 and 9.5. Preferable upper limits include 7.5, 5.0, 2.5 and 2.0. Within these ranges, excellent self-repairing properties, wear resistance, tensile properties, dirt resistance, etc., are obtained.

The total component (a2) content (based on non-volatiles) in the heat-curable composition is typically 10% to 95% by mass. Preferable lower limits include 10, 20, 30, 40, 50, 60, 70 and 80 (all in % by mass). Preferable upper limits include 80, 70, 60, 50, 40, 30 and 20 (all in % by mass). Within these ranges, excellent self-repairing properties, wear resistance, tensile properties, dirt resistance, etc., are obtained.

(Component (b))

The component (b) is an "an allophanate polyisocyanate and/or a biuret polyisocyanate." The "allophanate polyisocyanate" refers to a polyisocyanate having an allophanate bond represented by formula (b1)) shown below, which is formed by reaction of an isocyanate with a urethane bond formed upon reaction of a (poly)isocyanate and an alcohol. The "biuret polyisocyanate" refers to a polyisocyanate having a biuret bond represented by formula (b2) shown below, which is formed by trimerization of a (poly)isocyanate, etc. The component (b) does not necessarily consist of one species of polyisocyanate and may include two or more species of polyisocyanate.

[Chem 12]

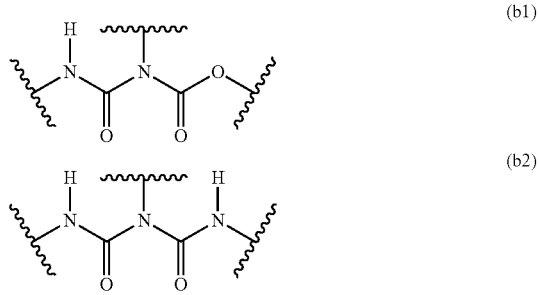

The number of isocyanate groups in the isocyanate used for preparing the component (b) is typically 1 to 10. Preferable upper limits include 8, 6, 4 and 2.

The isocyanate used for preparing the component (b) can be a diisocyanate represented by formula (b') shown below.

[Chem 13]

(In formula (b'), $R^{b'}$ is a divalent hydrocarbon group having 1 to 20 carbon atoms and possibly including at least one functional group selected from the group consisting of an oxa group, carbonyl group, oxycarbonyl group and carbonate group.)

As described above, "possibly including at least one functional group selected from the group consisting of an oxa group, carbonyl group, oxycarbonyl group and carbonate group" means that a carbon atom (methylene group) of the hydrocarbon group can be substituted with an oxa group (—O—), carbonyl group (>C=O), oxycarbonyl group (—O(C=O)—), carbonate group (—O(C=O)O—), etc. The "hydrocarbon group" may include a branched structure, cyclic structure and unsaturated carbon-carbon bond (carbon-carbon double bond, carbon-carbon triple bond) as described above.

The number of carbon atoms in $R^{b'}$ of formula (b') is 1 to 20. Preferable lower limits include 2, 3, 4 and 5. Preferable upper limits include 18, 16, 14, 12, 10 and 8.

Examples of the diisocyanates represented by formula (b') include the compounds represented by the formulas shown below. Among them, 1,6-hexamethylene diisocyanate (HDI) is particularly preferable.

[Chem 14]

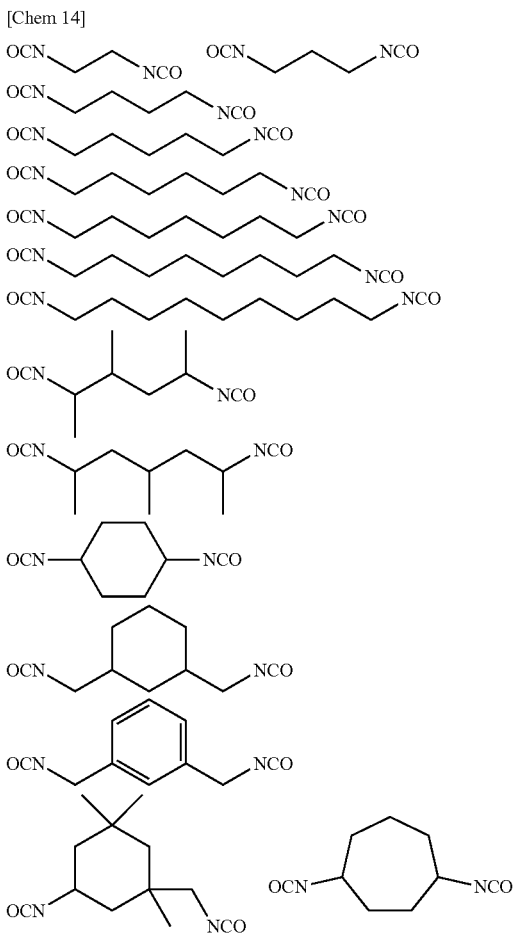

The number of hydroxyl groups in the alcohol used for preparing the allophanate polyisocyanate is typically 1 to 10. Preferable upper limits include 8, 6, 4 and 2.

The alcohol used for preparing the allophanate polyisocyanate can be an alcohol represented by formula (b″) shown below and having a molecular weight of 800 or lower. The "molecular weight" refers to the number average molecular weight when the alcohol is heterogeneous in molecular weight like a polymerization product, and to the formula weight when the alcohol is homogeneous in molecular weight like a non-polymerization product.

[Chem 15]

(In formula (b″), $R^{b″}$ is a h-valent hydrocarbon group having 1 to 50 carbon atoms and possibly including at least one functional group selected from the group consisting of an oxa group, carbonyl group, oxycarbonyl group and carbonate group; and h is 1 or 2.)

As described above, "possibly including at least one functional group selected from the group consisting of an oxa group, carbonyl group, oxycarbonyl group and carbonate group" means that a carbon atom (methylene group) of the hydrocarbon group can be substituted with an oxa group (—O—), carbonyl group (>C=O), oxycarbonyl group (—O(C=O)—), carbonate group (—O(C=O)O—), etc. The "hydrocarbon group" may include a branched structure, cyclic structure and unsaturated carbon-carbon bond (carbon-carbon double bond, carbon-carbon triple bond) as described above.

The number of carbon atoms in $R^{b″}$ of formula (b″) is 1 to 50. Preferable lower limits include 2, 3, 4 and 5. Preferable upper limits include 45, 40, 35, 30, 25, 20, 18, 16, 14, 12, 10 and 8.

The number of oxa groups in $R^{b″}$ of formula (b″) is typically 0 to 20. Preferable lower limits include 1, 2, 3, 4 and 5. Preferable upper limits include 18, 16, 14, 12 and 10.

The number of carbonyl groups in $R^{b″}$ of formula (b″) is typically 0 to 20. Preferable lower limits include 1, 2, 3, 4 and 5. Preferable upper limits include 18, 16, 14, 12 and 10.

The number of oxycarbonyl groups in $R^{b″}$ of formula (b″) is typically 0 to 20. Preferable lower limits include 1, 2, 3, 4 and 5. Preferable upper limits include 18, 16, 14, 12 and 10.

The number of carbonate groups in $R^{b″}$ of formula (b″) is typically 0 to 20. Preferable lower limits include 1, 2, 3, 4 and 5. Preferable upper limits include 18, 16, 14, 12 and 10.

The alcohol represented by formula (b″) has a molecular weight of 800 or lower. Preferable lower limits include 10, 20, 40, 60, 80, 100, 150, 200, 250, 300, 400, 500, 600 and 700. Preferable upper limits include 750, 700, 650, 600, 550, 500, 450, 400, 300, 200 and 100.

Examples of the alcohols represented by formula (b″) include the compounds represented by the following formulas:

[Chem 16]

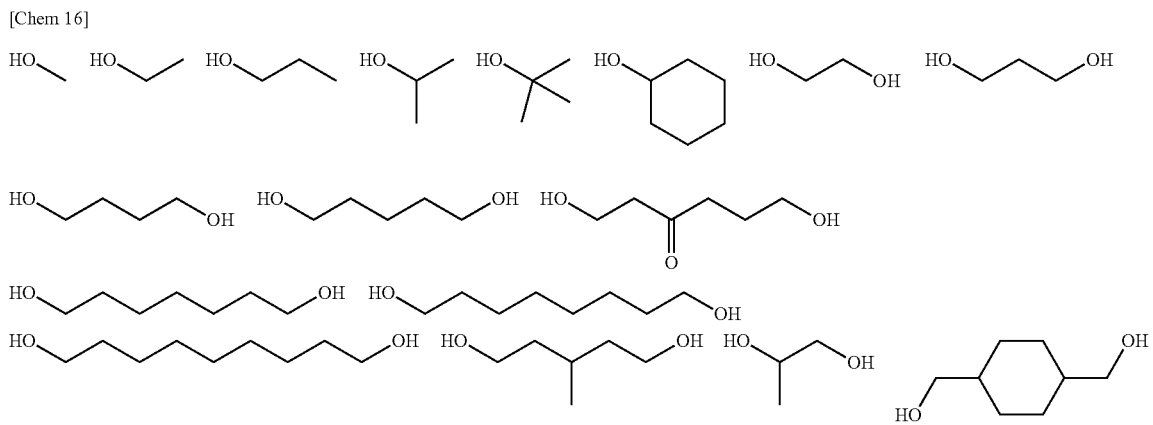

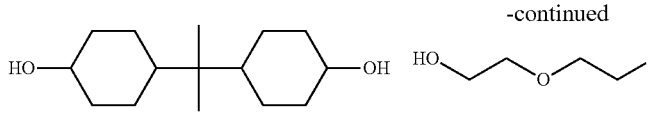

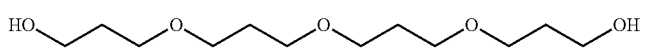

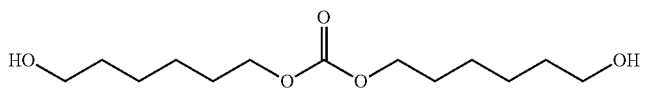

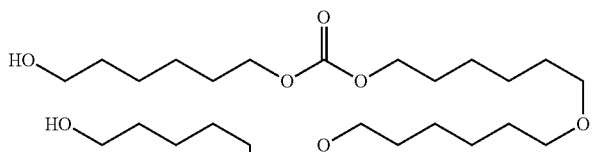

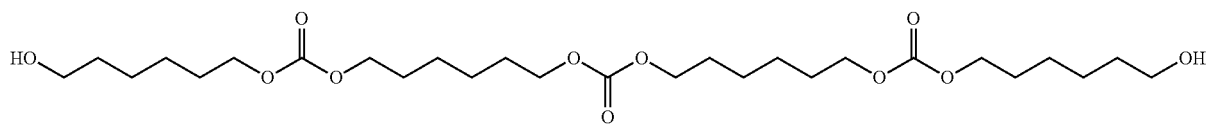

Based on non-volatiles, the isocyanate group (—NCO) content of the component (b) is typically 10% to 30% by mass. Preferable upper limits include 30, 25, 20 and 15 (all in % by mass). Preferable lower limits include 25, 20, 15 and 10 (all in % by mass). In an embodiment, from the standpoint of the self-repairing properties, wear resistance and tensile properties, the NCO content (% NCO of non-volatiles) of the component (b) is preferably 10% to 30% by mass.

The component (b) typically has a molecular weight of 100 to 5,000. Preferable lower limits include 200, 400, 600, 800, 1,000, 2,000, 3,000 and 4,000. Preferable upper limits include 4,000, 3,000, 2,000, 1,000, 800, 600 and 400. As described above, the "molecular weight" refers to the number average molecular weight when the component (b) is heterogeneous in molecular weight, and to the formula weight when the component (b) is homogeneous in molecular weight.

The allophanate polyisocyanate can be a polyisocyanate represented by formula (b1-1) shown below and having a number average molecular weight of 5000 or lower.

[Chem 17]

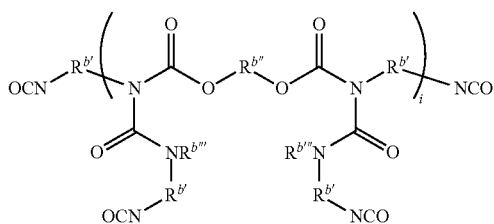

(b1-1)

(In formula (b1-1), $R^{b'}$ is independently a divalent hydrocarbon group having 1 to 20 carbon atoms and possibly including at least one functional group selected from the group consisting of an oxa group, carbonyl group, and carbonate group; $R^{b''}$ is independently a divalent hydrocarbon group having 1 to 50 carbon atoms and possibly including at least one functional group selected from the group consisting of an oxa group, carbonyl group and carbonate group; and each $R^{b'''}$ is a hydrogen atom or —$R^{b''}$NCO while at least one is a hydrogen atom and i is a positive number between 1 and 10.)

The polyisocyanate represented by formula (b") can be a polyisocyanate represented by the formula shown below and having a number average molecular weight of 5000 or lower. It is noted that the polyisocyanate represented by the formula shown below may be formed, using a diol formed by polymerization or by polymerization of a polyisocyanate and a diol, products obtained may vary in molecular weight or have slightly different structures. In other words, the polyisocyanate shown by the formula below represents a typical structure and may include a side product. Commercial allophanate polyisocyanates include CORONATE 2793 available from Tosoh Corporation and TAKENATE D-178N available from Mitsui Chemicals, Inc.

[Chem 18]

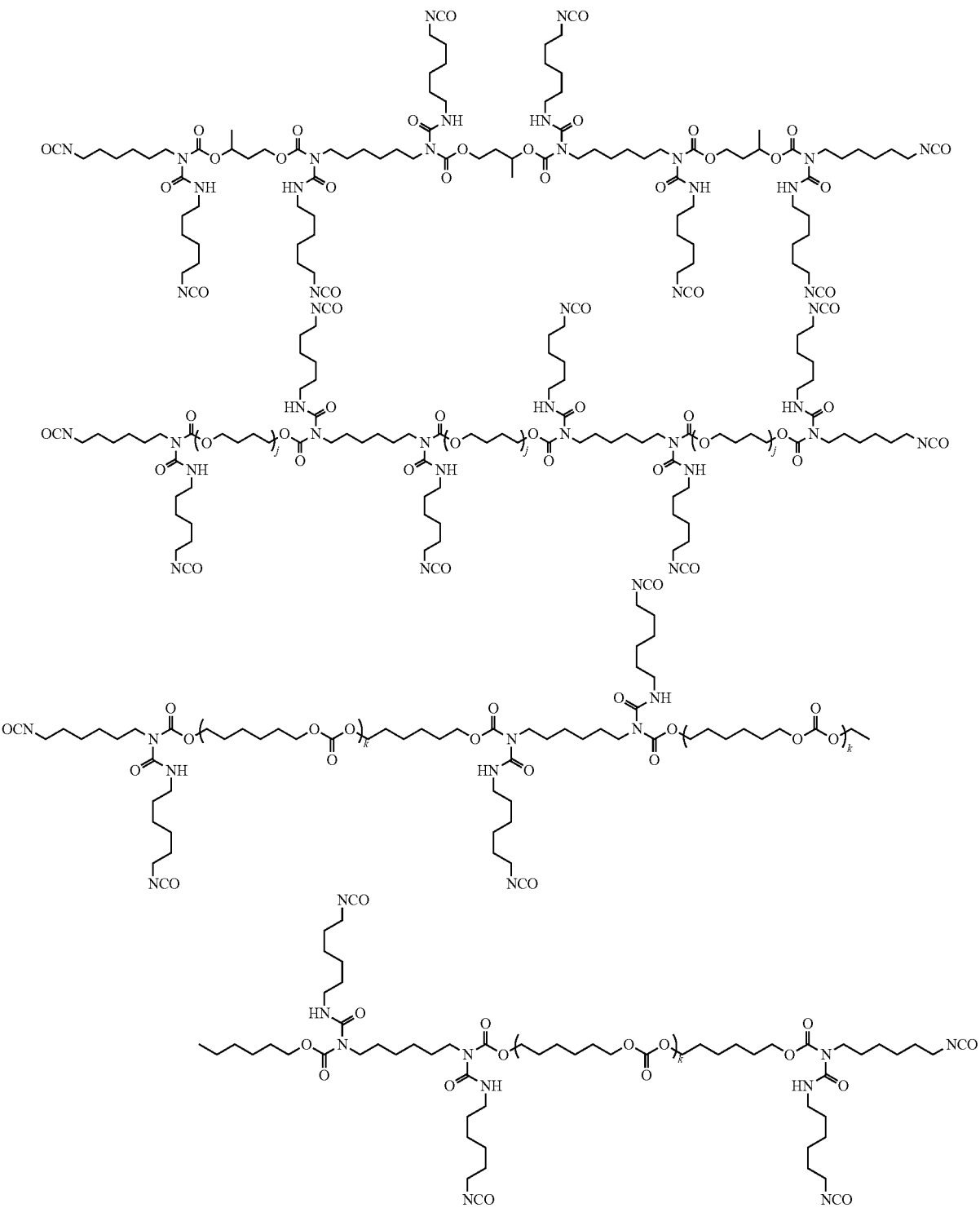

(In the formula, j is independently a positive number between 1 and 10, and k is independently a positive number between 1 and 10.)

Examples of the biuret polyisocyanate include DURANATE 24A-100, DURANATE 22A-75P and DURANATE 21S-75E available from Asahi Kasei Corporation, and DESMODUR N3200A (biuret hexamethylene diisocyanate) available from Sumitomo Bayer Urethane Co., Ltd.

Based on non-volatiles, the total amount of the component (b) in the heat-curable composition is typically 10% to 90% by mass. Preferable lower limits include 20, 30, 40, 50, 60, 70 and 80 (all in % by mass). Preferable upper limits include 80, 70, 60, 50, 40, 30 and 20 (all in % by mass).

Within these ranges, excellent self-repairing properties, wear resistance, tensile properties, dirt resistance, etc., are obtained.

The heat-curable composition typically has a component (a) to component (b) mass ratio (component (a)/component (b)) of 0.2 to 5.0. Preferable lower limits include 0.3, 0.4, 0.5, 0.6, 0.7, 0.8, 0.9, 1.0, 2.0, 3.0 and 4.0. Preferable upper limits include 4.0, 3.0, 2.0, 1.0, 0.9, 0.8, 0.7, 0.6, 0.5, 0.4, 0.3, 0.2 and 0.1. Within these ranges, excellent self-repairing properties, wear resistance, tensile properties, etc., are obtained.

(Component (c))

The component (c) is a "polysiloxane comprising a hydroxyl group-containing hydrocarbon group and/or polymer." It means that the "hydroxyl group-containing hydrocarbon group" and/or the "(hydroxyl group-containing) polymer" is terminally bonded to the polysiloxane and/or that the "hydroxyl group-containing hydrocarbon group" and/or the "(hydroxyl group-containing) polymer" is bonded as a side chain of the polysiloxane. The "polysiloxane" is typically a polydimethylsiloxane. It can be substituted with a hydrocarbon group with 2 to 6 carbon atoms or the like. The component (c) does not necessarily consist of one species polysiloxane and may include two or more species of polysiloxane.

Examples of the polysiloxane comprising a hydroxyl group-containing hydrocarbon group include X-22-4039, X-22-4015, X-22-4952, X-22-4272, X-22-170BX, X-22-170DX, KF-6000, KF-6001, KF-6002, KF-6003, KF-6123 and X-22-176F available from Shin-Etsu Chemical Co., Ltd.; and SILAPLANE FM-4411, SILAPLANE FM-4421, SILAPLANE FM-4425, SILAPLANE FM-0411, SILAPLANE FM-0421, SILAPLANE FM-DA11, SILAPLANE FM-DA21 and SILAPLANE FM-DA26 available from JNC Corporation.

Examples of the polysiloxane comprising a hydroxyl group-containing polymer include X-22-4952 and KF-6123 having polyether structures as polymers, available from Shin-Etsu Chemical Co., Ltd.; BYK-370, BYK-375, BYK-377 and BYK-SILCLEAN3720 having polyester structures as polymers, available from BYK Chemie Japan K.K.; ZX-028-G available from T&K TOKA Corporation, BYK-SILCLEAN3700 available from BYK Chemie Japan K.K. and SYMAC US-270 available from Toagosei Co., Ltd., having poly(meth)acrylic acid structures as polymers.

Based on non-volatiles, the total component (c) content of the heat-curable composition is typically 0.1% to 5.0% by mass. Preferable lower limits include 0.1, 0.2, 0.5, 0.9, 1.0, 2.0, 3.0 and 4.0 (all in % by mass). Preferable upper limits include 4.0, 3.0, 2.0, 1.0, 0.9, 0.5 and 0.2 (all in % by mass). Within these ranges, excellent dirt resistance is obtained.

(Component (d))

The surface layer is a layer formed by curing the heat-curable composition comprising the components (a) to (c). Preferably, the heat-curable composition further comprises a component (d) described below. The component (d) does not necessarily consist of one species of diol and may include two or more species of diol.

(d) A Diol Having a Hydroxyl Value of 200 mgKOH/g or Higher and a Molecular Weight of 500 or Lower (or Abbreviated to a "Component (d)" Hereinafter).

The component (d) is a "diol having a hydroxyl value of 200 mgKOH/g or higher and a molecular weight of 500 or lower." As described earlier, the "hydroxyl value" is determined based on non-volatiles by measurement according to JIS K 1557-1:2007. The "molecular weight" refers to the number average molecular weight when the diol is heterogeneous in molecular weight, and to the formula weight when the diol is homogeneous in molecular weight as described earlier.

The component (d) can be a diol represented by formula (d1) shown below.

[Chem 19]

(In formula (d1), Rd is a divalent hydrocarbon group having 1 to 40 carbon atoms and possibly including at least one functional group selected from the group consisting of an oxa group, carbonyl group and carbonate group.)

As described above, "possibly including at least one functional group selected from the group consisting of an oxa group, carbonyl group and carbonate group" means that a carbon atom (methylene group) of the hydrocarbon group can be substituted with an oxa group (—O—), carbonyl group (>C=O), carbonate group (—O(C=O)O—), etc. The "hydrocarbon group" may include a branched structure, cyclic structure and unsaturated carbon-carbon bond (carbon-carbon double bond, carbon-carbon triple bond) as described above.

The number of carbon atoms in $R^d$ of formula (d1) is 1 to 40. Preferable lower limits include 2, 3, 4 and 5. Preferable upper limits include 35, 30, 25, 20, 18, 16, 14, 12, 10 and 8.

The number of oxa groups in $R^d$ of formula (d1) is typically 0 to 20. Preferable lower limits include 2, 3, 4 and 5. Preferable upper limits include 18, 16, 14, 12 and 10.

The number of carbonate groups in $R^d$ of formula (d1) is typically 0 to 20. Preferable lower limits include 2, 3, 4 and 5. Preferable upper limits include 18, 16, 14, 12 and 10.

Examples of the diols represented by formula (d1) include the compounds represented by the following formulas:

[Chem 20]

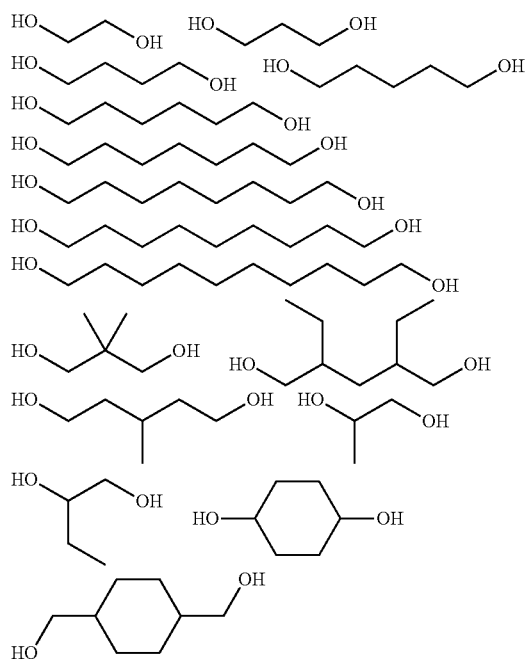

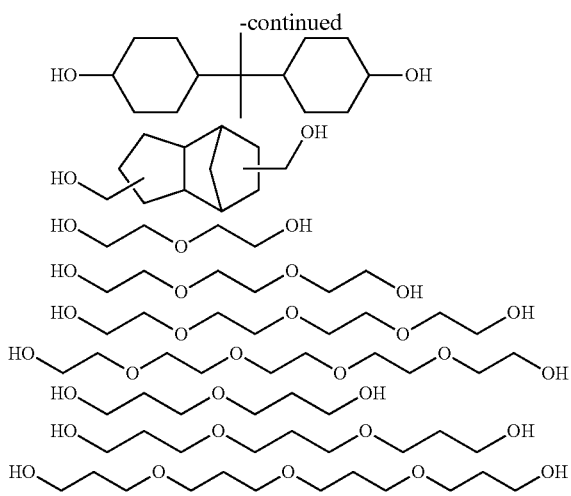

The component (d) has a hydroxyl value of 200 mgKOH/g or higher. Preferable lower limits include 250, 500, 750, 900, 975, 990, 1000, 1050, 1060, 1070, 1080, 1090, 1100, 1250 and 1500 (all in mgKOH/g). Preferable upper limits include 1600, 1500, 1250, 1100, 1090, 1080, 1070, 1060, 1050, 1000, 990, 975, 950, 900, 750, 500 and 250 (all in mgKOH/g).

The component (d) has a molecular weight of 500 or lower. Preferable lower limits include 50, 75, 100, 105, 109, 110, 115, 119, 120, 150, 200, 250, 300, 350, 400, 450 and 490. Preferable upper limits include 490, 450, 400, 350, 300, 250, 200, 150, 120, 119, 115, 110, 109, 105, 100 and 75.

Based on non-volatiles, the total component (d) content of the heat-curable composition is typically 0 to 20% by mass. Preferable lower limits include 1.0, 3.0, 5.0, 9.0, 10, 15 and 19 (all in % by mass). Preferable upper limits include 19, 15, 10, 9.0, 5.0, 3.0 and 1.0 (all in % by mass). Within these ranges, excellent self-repairing properties, wear resistance, leveling properties, etc., are obtained.

The heat-curable composition typically has a component (d) to component (a) mass ratio (component (d)/component (a)) of 0 to 1.0. Preferable lower limits include 0.1, 0.2, 0.3, 0.4, 0.5, 0.6, 0.7, 0.8 and 0.9. Preferable upper limits include 0.9, 0.8, 0.7, 0.6, 0.5, 0.4, 0.3, 0.2 and 0.1. Within these ranges, excellent self-repairing properties, wear resistance, leveling properties, etc., are obtained.

The heat-curable composition typically has a component (d) to component (b) mass ratio (component (d)/component (b)) of 0 to 0.5. Preferable lower limits include 0.1, 0.2, 0.3 and 0.4. Preferable upper limits include 0.4, 0.3, 0.2 and 0.1.

The surface layer is formed by curing the heat-curable composition comprising the components (a) to (c). The heat-curable composition may further include other compound(s). The other compounds can be a curing catalyst (or abbreviated to a "component (e)" hereinafter), organic solvent (or abbreviated to a "component (f)" hereinafter), thermostabilizing agent, triol, tetraol, polymerization inhibitor, antioxidant, photo-stabilizer, defoaming agent, surface-adjusting agent, pigment, antistatic agent, dispersion of fine particles of a metal oxide, and dispersion of fine organic particles.

Described next in detail are the "component (e)" and "component (f)."

(Component (e))

The component (e) is a curing catalyst that accelerates curing of the heat-curable composition. The curing catalyst can be an organometallic catalyst, organic amine catalyst, etc. Examples of organometallic catalysts include an organo typical-metal catalyst and an organo transition-metal catalyst. Examples of organo typical-metal catalysts include an organotin catalyst such as dibutyltin dilaurate and dioctyltin dilaurate and an organobismuth catalyst such as bismuth octylate. Examples of organo transition-metal catalysts include an organotitanium catalyst such as titanium ethyl acetoacetate; an organozirconium catalyst such as zirconium tetra-acetyl acetate; an organoiron catalyst such as iron acetyl acetonate. Examples of organic amine catalysts include diazabicyclooctane, dimethylcyclohexylamine, tetramethylpropylenediamine, ethylmorpholine, dimethyl ethanolamine, triethylamine, and triethylenediamine. The component (e) does not necessarily consist of one species of curing catalyst and may include two or more species of curing catalyst.

Based on non-volatiles, the total component (e) content of the heat-curable composition is typically 0 to 1.0% by mass. Preferable lower limits include 0.01, 0.02, 0.05, 0.09, 0.1, 0.25, 0.5, 0.75 and 0.9 (all in % by mass). Preferable upper limits include 0.9, 0.75, 0.5, 0.25, 0.1, 0.09, 0.05, 0.02. and 0.01 (all in % by mass). Within these ranges, excellent curing properties, pot life, etc., are obtained.

(Component (f))

The component (f) is an organic solvent. Examples of organic solvents include ketone solvents such as methyl ethyl ketone, acetylacetone, methyl isobutyl ketone and cyclohexane; aromatic solvents such as toluene and xylene; alcohol solvents such as methanol, ethanol, n-propanol, isopropanol and butanol; glycol ether solvents such as ethylene glycol dimethyl ether, diethylene glycol dimethyl ether, triethylene glycol dimethyl ether, diethylene glycol methyl ethyl ether, diethylene glycol diethyl ether and propylene glycol monomethyl ether acetate; ester solvents such as ethyl acetate, butyl acetate, methyl cellosolve acetate and cellosolve acetate; petroleum-based solvents such as SOLVESSO #100 and SOLVESSO #150 (both available from Exxon Mobil Corporation); haloalkane solvents such as chloroform; and amide solvents such as dimethylformamide. Among them, from the standpoint of the pot life, ketone solvents are preferable and acetyl acetone is particularly preferable. The component (f) does not necessarily consist of one species of organic solvent and may include two or more species of organic solvent.

The total component (f) content of the heat-curable composition is typically 50% to 90% by mass. Preferable lower limits include 55, 60, 70 and 80 (all in % by mass). Preferable upper limits include 80, 70 and 60 (all in % by mass). Within these ranges, excellent curing properties, pot life, etc., are obtained.

The molar ratio (NCO/OH) of isocyanate groups in the component (b) to hydroxyl groups in the components (a), (c), (d) and other components is typically 0.05 to 10. Preferable lower limits include 0.1, 0.5, 1.0, 2.0, 3.0, 4.0, 5.0, 6.0, 7.0, 8.0 and 9.0. Preferable upper limits include 9.0, 8.0, 7.0, 6.0, 5.0, 4.0, 3.0 and 2.0. Within these ranges, excellent self-repairing properties, wear resistance, dirt resistance, tensile properties, etc., are obtained.

The surface layer has a thickness of typically 2 μm to 20 μm, preferably 3 μm or greater, more preferably 4 μm or greater, yet more preferably 5 μm or greater, or particularly preferably 6 μm or greater; and preferably 18 μm or less, more preferably 16 μm or less, yet more preferably 14 μm or less, or particularly preferably 12 μm or less. Within these ranges, self-repairing properties are readily obtained and the sort of cracking of the surface layer can be effectively inhibited. The thickness of the surface layer refers to a value determined by observing a cross section using an optical microscope, electron microscope, etc.

<Resin Substrate Layer>

The resin substrate layer comprises a resin (high-molecular compound). The species of resin (high-molecular compound) or its physical properties are not particularly limited. The resin in the resin substrate layer can be classified as a plastomer and an elastomer. Examples of plastomers include an olefinic plastomer such as polyethylene and polypropylene. Examples of elastomers include a thermoplastic elastomer (TPE). Among these, thermoplastic elastomers are particularly preferable.

Examples of the types of thermoplastic elastomer include a thermoplastic polyurethane elastomer (TPU), thermoplastic polyester elastomer (TPC (TPEE)), thermoplastic polyamide elastomer (TPAE, TPA), thermoplastic polyolefin elastomer (TPO), thermoplastic polystyrene elastomer (SBC, TPS), thermoplastic polyvinyl chloride elastomer (TPVC), and thermoplastic polybutadiene elastomer. For their excellent heat resistance, thermoplastic polyurethane elastomers, thermoplastic polyester elastomers and thermoplastic polyamide elastomers are preferable; and thermoplastic polyurethane elastomers are particularly preferable. The material of the resin substrate layer affects the surface layer's self-repairing properties, peel resistance between the surface layer and resin substrate layer, wear resistance, etc. Especially with a thermoplastic elastomer such as a thermoplastic polyurethane elastomer, the resulting surface-protective PSA sheet can provide excellent tightness of adhesion to the surface layer and effectively inhibit peeling while showing significantly higher levels of self-repairing properties and wear resistance, thereby maintaining the appearance, etc., in good conditions.

Examples of polyols (typically long-chain diols) in the thermoplastic polyurethane elastomer include polyester polyols, polyether polyols and polycarbonate polyols. For excellent fuel oil resistance, a thermoplastic polyurethane elastomer comprising a polyester polyol is preferable; and an adipate polyol and polycaprolactone polyol are particularly preferable.

The resin substrate layer has a Shore hardness (JIS K 6253-3:2012) of typically 30A to 80D, preferably 50A or higher, more preferably 70A or higher, yet more preferably 80A or higher, particularly preferably 90A or higher; and preferably 65D or lower, or more preferably 97A or lower. Within these ranges, particularly great stress-relaxing effect can be obtained, leading to effective inhibition of peeling and lifting.

The resin substrate layer may include known additives in accordance with the purpose, such as pigment, filler, antioxidant, photo-stabilizer (including radical scavenger and UV absorber), slip agent and anti-blocking agent.

The resin substrate layer can be subjected to a known surface treatment in accordance with the purpose, such as acid treatment, corona discharge treatment, UV irradiation treatment, plasma treatment and release treatment.

The resin substrate layer has a thickness of typically 50 µm to 1000 µm, preferably 70 µm or greater, more preferably 100 µm or greater, yet more preferably 140 µm or greater, or particularly preferably 180 µm or greater; and preferably 800 µm or less, more preferably 600 µm or less, yet more preferably 400 µm or less, or particularly preferably 300 µm or less. Within these ranges, mechanical strength and conformability to structures of adherends can be readily obtained while effectively inhibiting peeling and lifting. The thickness of the resin substrate layer refers to a value determined by observing a cross section using an optical microscope, electron microscope, etc.

<PSA Layer>

The PSA layer is a layer formed with a PSA composition comprising an elastomer and can adhere to an adherend solely by applying some pressure. Examples of the species of PSA include a (meth)acrylic PSA comprising a (meth) acrylic resin as the elastomer; a rubber-based PSA comprising a rubber as the elastomer, such as natural rubber, synthetic isoprene rubber, regenerated rubber, styrene-butadiene rubber (SBR), polyisobutylene rubber and butyl rubber; and a silicone-based PSA comprising a silicone rubber as the elastomer. A (meth)acrylic PSA is particularly preferable.

The PSA composition may include a crosslinking agent. Examples of crosslinking agents include an epoxy-based crosslinking agent comprising two or more epoxy groups capable of reacting with carboxyl groups, hydroxyl groups, mercapto groups, isocyanate groups, unsaturated carbon-carbon bonds, etc.; an isocyanate-based crosslinking agent comprising two or more isocyanate groups capable of reacting with carboxyl groups, hydroxyl groups, mercapto groups, amino groups, etc.; and an oxazoline-based crosslinking agent comprising two or more oxazoline structures capable of reacting carboxyl groups, hydroxyl groups, etc. Among them, epoxy-based crosslinking agents and isocyanate-based crosslinking agents such as those represented by the formulas shown below are preferable, and epoxy-based crosslinking agents are particularly preferable. With an epoxy-based crosslinking agent, the resulting surface-protective PSA sheet is likely to have well-balanced adhesive strength. It is noted that the compounds represented by the following formulas are commercially available, and can be suitably obtained and used in forming the PSA layer (e.g. TETRAD-C available from Mitsubishi Gas Chemical Company, Inc.).

[Chem 21]

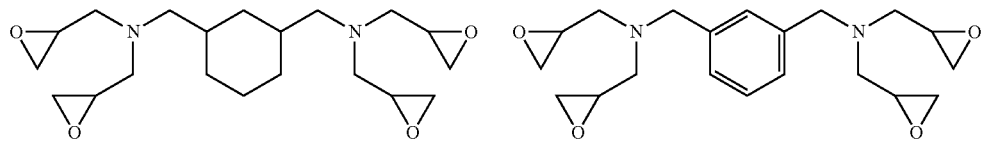

-continued

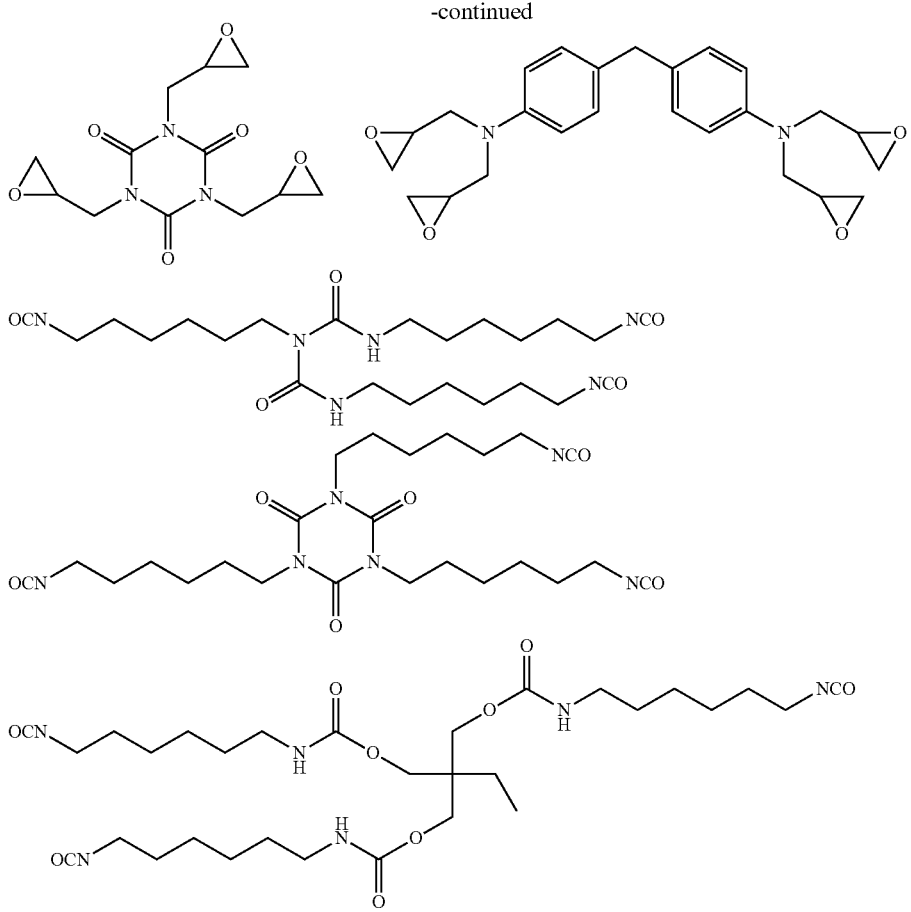

The crosslinking agent content (the combined content when two or more species are included) of the PSA composition is typically 0.01 part to 0.5 part by mass with the (meth)acrylic copolymer being 100 parts by mass. It is preferably 0.02 part by mass or greater, more preferably 0.03 part by mass or greater, yet more preferably 0.05 part by mass or greater, or particularly preferably 0.07 part by mass or greater; and preferably 0.3 part by mass or less, more preferably 0.25 part by mass or less, or yet more preferably 0.2 part by mass or less. Within these ranges, the resulting surface-protective PSA sheet is likely to have adhesive strength well-balanced for various adherends varying in polarity.

The PSA composition may include a tackifier Examples of tackifiers include natural resin-based species such as rosin-based resins (rosins (gum rosin, tall rosin, wood rosin), modified rosins (hydrogenated rosin, disproportionated rosins, polymerized rosins), rosin esters), and terpene-based resins (terpene resins (α-pinene-based, β-pinene-based, dipentenes), aromatic modified terpene resins, hydrogenated terpene resins, terpene phenol resins); and synthetic resin-based species such as aliphatic hydrocarbon resins, aromatic hydrocarbon resins, aliphatic aromatic hydrocarbon copolymer resins, alicyclic hydrocarbon resins, styrene resins, phenol resins (alkyl phenol resins, rosin modified phenol resins, etc.), and xylene resins.

The tackifier has a softening point of typically 60° C. to 180° C., preferably 90° C. or higher, more preferably 110° C. or higher, or yet more preferably 120° C. or higher. Within these ranges, so-called "fogging" (fogging of automobile windshields, etc.) can be inhibited. The softening point of tackifier refers to a value determined by a softening point testing method (ring and ball method) specified in JIS K 5902:2006 or JIS K 2207:2006.

The tackifier content (the combined content when two or more species are included) of the PSA composition is 1.0 part to 30 parts by mass with the (meth)acrylic copolymer being 100 parts by mass. It is preferably 2.0 parts by mass or greater, more preferably 4.0 parts by mass or greater, yet more preferably 8.0 parts by mass or greater, or particularly preferably 12 parts by mass or greater; and 26 parts by mass or less, more preferably 22 parts by mass or less, yet more preferably 18 parts by mass or less, or particularly preferably 16 parts by mass or less. Within these ranges, the resulting adhesive strength is particularly well-balanced for various adherends varying in polarity while touch-up paint peeling and the increase in adhesive strength with time can be effectively reduced.

The PSA layer and the PSA composition may include other compounds besides the elastomer, tackifier and crosslinking agent. Examples of additives include leveling agent, crosslinking aid, plasticizer, softener, filler, colorant (pigment, dye, etc.), antistatic agent, anti-aging agent, UV absorber, antioxidant and photo-stabilizer.

The PSA layer is formed with the PSA composition. Examples of methods for forming the PSA layer include a direct method where it is formed by applying the PSA composition to a resin substrate, and a transfer method where a layer is formed with the PSA composition and transferred to the resin substrate.

Examples of the means of applying the PSA composition include a gravure roll coater, dip roll coater and die coater.

When the applied PSA composition is heated to dry, the temperature is typically 30° C. to 160° C., preferably 40° C. or higher and preferably 150° C. or lower.

The PSA layer has a thickness of typically 3 μm to 150 μm, preferably 5 μm or greater, more preferably 8 μm or greater, yet more preferably 12 μm or greater, or particularly preferably 15 μm or greater; and preferably 100 μm or less, more preferably 80 μm or less, yet more preferably 60 μm or less, or particularly preferably 55 μm or less. Within these ranges, excellent impact-absorbing properties and stress-relaxing effect can be obtained while effectively inhibiting peeling and lifting. The thickness of the PSA layer refers to a value determined by observing a cross section using an optical microscope, electron microscope, etc.

<Shape/Physical Properties of Surface-Protective PSA Sheet>

Figure 1B:
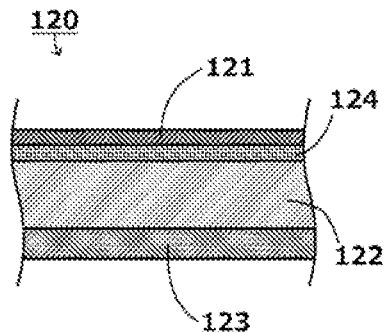
Figure 1C:
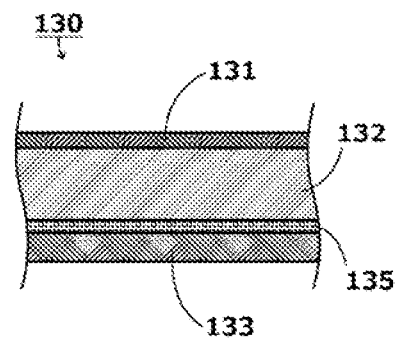
Figure 1D:
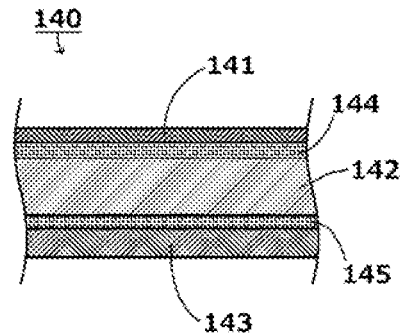

The surface-protective PSA sheet comprises a surface layer, a resin substrate layer and a PSA layer; and has a multilayer structure with the resin substrate layer placed between the surface layer and the PSA layer. As long as the multilayer structure has the surface layer, resin substrate layer and PSA layer laminated in this order, other layers may be included between the surface layer and the resin substrate layer and between the resin substrate layer and the PSA layer. For instance, like a surface-protective PSA sheet 110 in FIG. 1(A), it may consist of a surface layer 111, resin substrate layer 112 and PSA layer 113; like a surface-protective PSA sheet 120 in FIG. 1(B), it may have a surface-layer-side middle layer 124 in addition to a surface layer 121, resin substrate layer 122 and PSA layer 123; like a surface-protective PSA sheet 130 in FIG. 1(C), it may have a PSA-layer-side middle layer 135 in addition to a surface layer 131, resin substrate layer 132 and PSA layer 133; like a surface-protective PSA sheet 140 in FIG. 1(D), it may have a surface-layer-side middle layer 144 and a PSA-layer-side middle layer 145 in addition to a surface layer 141, resin substrate layer 142 and PSA layer 143.

In the surface-protective PSA sheet, the number of the other layers excluding the surface layer, resin substrate layer and PSA layer is typically 5 or lower, preferably 3 or lower, yet more preferably 2 or lower, or particularly preferably 1 or lower. Within these ranges, the manufacturing cost can be reduced.

The surface-protective PSA sheet may have a release liner.

The material of the release liner can be a polyester-based resin such as polyethylene terephthalate (PET), a polyolefin resin such as polyethylene (PE) and polypropylene (PP), a fluororesin such as polytetrafluoroethylene, etc. In the release liner, the surface adhered to the PSA layer is typically subjected to release treatment.

The surface-protective PSA sheet has a thickness of typically 100 μm to 1000 μm, preferably 110 μm or greater, more preferably 120 μm or greater, yet more preferably 130 μm or greater, or particularly preferably 150 μm or greater; and preferably 850 μm or less, more preferably 650 μm or less, yet more preferably 500 μm or less, or particularly preferably 400 μm or less. Within these ranges, great effects can be obtained on reducing damage to adherends and well maintaining their appearance, etc., while effectively inhibiting peeling and lifting. The thickness of the surface-protective PSA sheet refers to a value determined by observing a cross section using an optical microscope, electron microscope, etc.

The surface-protective PSA sheet is not particularly limited in other features. Described below are preferable test values measured and determined by the respective tests for evaluating the wear resistance, transparency, glossiness and dirt resistance (see below).

(Wear Resistance)

The difference in haze value (ΔH) of the surface-protective PSA sheet before and after a Taber wear test is typically 0.1% to 80%, preferably 50% or less, more preferably 30% or less, yet more preferably 20% or less, particularly preferably 15% or less, or most preferably 10% or less. The Taber wear test refers to the method according to JIS K7204:1999 (Testing Method for Abrasion Resistance of Plastics by Abrasive Wheels) and is carried out with abrasive wheels allowed to rotate 1000 times at a rotational speed of 72 rpm under a load of 500 g. The difference in haze value (ΔH) before and after the Taber wear test refers to the value of (post-test haze value)−(pre-test haze value), determined using a haze meter with respect to the surface-protective PSA sheet before and after the Taber wear test.

(Transparency)

The surface-protective PSA sheet has a haze value (at an initial, untested condition) of typically 0.1% to 10%, preferably 8% or lower, more preferably 5% or lower, yet more preferably 3% or lower, or particularly preferably 2% or lower. The haze value refers to a value determined using a haze meter according to the method described in Examples.

The surface-protective PSA sheet has a total light transmittance of typically 60% to 99.9%, preferably 65% or higher, more preferably 70% or higher, yet more preferably 75% or higher, or particularly preferably 80% or higher; and preferably 99.5% or lower, more preferably 99.0% or lower, yet more preferably 98.5% or lower, or particularly preferably 98.0% or lower. The total light transmittance refers to a value determined using a haze meter according to the method described in Examples.

(Glossiness)

The surface-protective PSA sheet has a gloss of typically 50 to 99, preferably 55 or higher, more preferably 60 or higher, yet more preferably 65 or higher, or particularly preferably 70 or higher, at a measurement angle of 20°. The gloss refers to a value determined using a micro-TRI-gloss meter according to the method described in Examples.

(Dirt Resistance)

The surface-protective PSA sheet has a difference in L* value before and after a dirt resistance test (using JIS Z-8902-84; see Examples for details), ΔL*, of typically 0.01 to 45.0, preferably 40.0 or less, more preferably 30.0 or less, yet more preferably 15.0 or less, or particularly preferably 8.0 or less. The ΔL* (pre-test L* value−post-test L* value) refers to a value determined using a multi-angle spectrophotometer according to the method described in Examples.

The Δ haze value (ΔH), that is the difference in haze value before and after the dirt resistance test, is typically 0% to 15%, preferably 12% or less, more preferably 10% or less, yet more preferably 8% or less, or particularly preferably 5% or less. The haze value refers to a value determined using a haze meter according to the method described in Examples.

The Δ total light transmittance (ΔT), that is the difference in total light transmittance before and after the dirt resistance test, is typically 0% to 20%, preferably 18% or less, more preferably 15% or less, yet more preferably 12% or less, or particularly preferably 10% or less. The total light transmittance refers to a value determined using a haze meter according to the method described in Examples.

The method for producing the surface-protective PSA sheet is not particularly limited. It can be produced suitably employing conventional knowledge. In particular, a preferable method for producing the surface-protective PSA sheet (or abbreviated to a "surface-protective PSA sheet production method" hereinafter) comprises the following heat-curable composition preparation step, resin substrate preparation step, PSA composition preparation step, surface layer-forming step, and PSA layer-forming step:

a heat-curable composition preparation step of preparing a heat-curable composition comprising the following components (or abbreviated to a "heat-curable composition preparation step" hereinafter):
(a) a hydroxyl group-containing (meth)acrylic copolymer having a glass transition temperature of −40° C. to 30° C.;
(b) an allophanate polyisocyanate and/or a biuret polyisocyanate; and
(c) a polysiloxane including a terminal hydroxyl group-containing hydrocarbon group and/or polymer.
a resin substrate preparation step of preparing a resin substrate (or abbreviated to a "resin substrate preparation step" hereinafter)
a PSA composition preparation step of preparing a PSA composition (or abbreviated to a "PSA composition preparation step" hereinafter)
a surface layer-forming step of forming a surface layer on the resin substrate using the heat-curable composition (or abbreviated to a "surface layer-forming step" hereinafter)
a PSA layer-forming step of forming a PSA layer on the resin substrate using the PSA composition (or abbreviated to a "PSA layer-forming step" hereinafter).

With respect to details such as conditions of the heat-curable composition preparation step, resin substrate preparation step, PSA composition preparation step, surface layer-forming step and PSA layer-forming step, the content described earlier can be referenced.

EXAMPLES

The present invention is further described with working examples, while suitable modifications can be made within the scope of this invention. Accordingly, the scope of the invention should not be understood in limited ways because of the specific examples shown below.
<Preparation of Starting Materials>
{(Meth)Acrylic Resin}
[Resin A]
To a reaction vessel equipped with a stirrer, thermometer, reflux condenser, addition funnel and nitrogen inlet, were added 24.0 parts by mass of methyl methacrylate (or abbreviated to "MMA" hereinafter), 59.0 parts by mass of n-butyl acrylate (or abbreviated to "BA" hereinafter) and 17.0 parts by mass of 2-hydroxyethyl acrylate (or abbreviated to "HEA" hereinafter) as well as 150 parts by mass of methyl ethyl ketone. The reaction mixture was set at 80° C. Subsequently, was added 0.5 part by mass of azobisisobutyronitrile and the resultant was heated at around 80° C. for 5 hours. Then, was added 1.0 part by mass of azobisisobutyronitrile and the reaction mixture was further heated at around the same temperature for 4 hours. The reaction mixture was then allowed to cool to room temperature to obtain a solution (40% NV) of resin A having the physical properties shown in Table 1.
Resin A had an acid value of 0 mgKOH/g.
[Resin B]
To a reaction vessel equipped with a stirrer, thermometer, reflux condenser, addition funnel and nitrogen inlet, were added 41.0 parts by mass of MMA, 42.0 parts by mass of BA and 17.0 parts by mass of HEA as well as 150 parts by mass of methyl ethyl ketone. The reaction mixture was set at 80° C. Subsequently, was added 0.5 part by mass of azobisisobutyronitrile and the resultant was heated at around 80° C. for 5 hours. Then, was added 1.0 part by mass of azobisisobutyronitrile and the reaction mixture was further heated at around the same temperature for 4 hours. The reaction mixture was then allowed to cool to room temperature to obtain a solution (40% NV) of resin B having the physical properties shown in Table 1.
Resin B had an acid value of 0 mgKOH/g.
[Resin C]
To a reaction vessel equipped with a stirrer, thermometer, reflux condenser, addition funnel and nitrogen inlet, were added 54.0 parts by mass of MMA, 29.0 parts by mass of BA and 17.0 parts by mass of HEA as well as 150 parts by mass of methyl ethyl ketone. The reaction mixture was set at 80° C. Subsequently, was added 0.5 part by mass of azobisisobutyronitrile and the resultant was heated at around 80° C. for 5 hours. Then, was added 1.0 part by mass of azobisisobutyronitrile and the reaction mixture was further heated at around the same temperature for 4 hours. The reaction mixture was then allowed to cool to room temperature to obtain a solution (40% NV) of resin C having the physical properties shown in Table 1.
Resin C had an acid value of 0 mgKOH/g.
[Resin D]
Was obtained SRN-230-50B (modified acrylic polyol) available from Tosoh Corporation as a solution of resin D (solvent: butyl acetate, 47-51% NV).

TABLE 1

Table 1

| Resin | Tg(Fox) (° C.) | Tg(DSC) (°C.)[*1] | Hydroxyl value (mgKOH/g) | MMA wt % | BA wt % | HEA wt % |
|---|---|---|---|---|---|---|
| A | −22 | −23 | 80 | 24 | 59 | 17 |
| B | 0 | — | 80 | 41 | 42 | 17 |
| C | 20 | — | 80 | 54 | 29 | 17 |
| D | 0[*2] | — | 47-51[*3] | — | — | — |

[*1]Heating rate for Tg (DSC): 10° C./min (under nitrogen flow)
[*2]Catalog value
[*3]Catalog value (as solution)

<Preparation of Heat-Curable Compositions>
(Synthetic Example 1)
Were used 61.8 parts by mass of resin A as the component (a), 62.0 parts by mass of CORONATE 2793 (allophanate hexamethylene diisocyanate available from Tosoh Corporation) (100% NV) as the component (b), 1.0 part by mass (as 100% NV) of BYK-SILCLEAN 3700 (acrylic polymer modified hydroxyl group-containing modified organic silicone available from BYK Chemie Japan K.K.) as the component (c), 0.03 part by mass of dioctyltin dilaurate (or DOTDL hereinafter; 100% NV) as the component (d), 132.5 parts by mass of methyl ethyl ketone (or MEK hereinafter) and 16.1 parts by mass of acetyl acetone (or AcAc hereinafter) as diluents. These components were mixed well to prepare a heat-curable composition (35% NV).
(Synthetic Examples 2 to 6)
The composition was changed as shown in Table 2 below. Otherwise in the same manner as Synthetic Example 1, were prepared heat-curable compositions of Synthetic Examples 2 to 6. It is noted that DOTDL was used in the same amount (0.03 part by mass) as Synthetic Example 1 in Synthetic Examples 2 to 6 as well.

TABLE 2

| | | Syn. Ex. 1 | Syn. Ex. 2 | Syn. Ex. 3 | Syn. Ex 4 | Syn. Ex. 5 | Syn. Ex. 6 |
|---|---|---|---|---|---|---|---|
| Component (a) (Pts by mass) | Resin A (Tg: −22° C.) | 61.8 | 57.5 | | | | |
| | Resin B (Tg: 0° C.) | | | 57.5 | 51.9 | | |
| | Resin C (Tg: 20° C.) | | | | | 63.3 | |
| | Resin D (Tg: 0° C.) | | | | | | 135.2 |
| Component (b) (pts by mass) | Coronate 2793 | 62.0 | 64.5 | 64.5 | 68.0 | 61.0 | 31.4 |
| Component (c) (pts by mass) | BYK-SILCLEAN3700 | 1.0 | 1.0 | 1.0 | 0.9 | 1.1 | 1.0 |
| Component (d) (pts by mass) | 1,6-hexanediol | 12.3 | | | | | |
| | 1,5-pentanediol | | 11.5 | 11.5 | 10.4 | 12.6 | |
| Diluents (pts by mass) | MEK | 132.5 | 135.1 | 135.1 | 138.5 | 131.6 | |
| | AcAc | 16.1 | 16.1 | 16.1 | 16.1 | 16.1 | |
| | Ethyl acetate | | | | | | 118.1 |
| | Amount added | 285.7 | 285.7 | 285.7 | 285.7 | 285.7 | 285.7 |
| | Non-volatile content | 100.0 | 100.0 | 100.0 | 100.0 | 100.0 | 100.0 |

Coronate 2793: Coronate 2793 available from Tosoh Corporation
BYK-SILCLEAN 3700: BYK-SILCLEAN 3700 available from BYK Chemie Japan K.K.

<Preparation of PSA>

To a mixture of 90 parts by mass of isononyl acrylate and 10 parts by mass of acrylic acid as monomers, were added 0.05 part by mass of product name IRGACURE 651 (available from Chiba Specialty Chemicals K.K.) and 0.05 part by mass of product name IRGACURE 184 (available from Chiba Specialty Chemicals K.K.) as photopolymerization initiators. Subsequently, the resulting mixture was UV-irradiated to a viscosity of about 25 Pa·s (BH viscometer, No. 5 rotor, 10 rpm, measurement temperature 30° C.) to prepare a partially-polymerized acrylic composition (UV syrup). To 100 parts by mass of the resulting UV syrup, were added 0.20 part by mass of isononyl acrylate, 0.20 part by mass of trimethylolpropane triacrylate and 1 part by mass of a hindered phenolic antioxidant (product name IRGANOX 1010 available from Chiba Specialty Chemicals K.K.) to prepare an acrylic PSA.

<Preparation of Surface-Protective PSA Sheets>

Examples 1 to 13

Each of the heat-curable compositions of Synthetic Examples 1 to 6 described above was applied to one side of the substrate (thermoplastic polyurethane elastomer film) shown in Table 3 to have a coating thickness of 10 μm when dried, allowed to dry at 120° C. for 120 seconds and aged at 40° C. for 2 days. To the substrate surface side (bare face side) of the surface-coated substrate, the aforementioned acrylic PSA was applied to a final thickness of 50 μm. The resultant was allowed to cure under UV irradiation to form a PSA layer, whereby each of the surface-protective PSA sheets of Examples 1 to 13 was fabricated.

(1) Evaluation Test 1:
<Self-Repairing Properties>

The surface-protective PSA sheet's surface (the backside of the PSA layer of the surface-protective PSA sheet, i.e., the surface on the reverse side of the PSA layer) was rubbed 100 times with a brass brush and the extent of scratches was visually inspected. The results are shown in Tables 3 and 4.

<Test Grades>

Good: no scratches found

Mediocre: 10 or fewer scratches found

Poor: countless scratches found

<Peel Resistance (Interface Between Surface Layer and Resin Substrate Layer)>

After rubbed with the brass brush in the self-repairing property test, the occurrence of peeling (separation) between their surface layers and resin substrate layers was visually inspected. The results are shown in Tables 3 and 4.

<Test Grades>

Good: no separation found

Poor: separation found (2) Evaluation Test 2:
<Wear Resistance>

According to the Testing Method for Abrasion Resistance of Plastics by Abrasive Wheels in JIS K 7204:1999, the haze value was measured (by HM-100 available from Murakami Color Research Laboratory Co., Ltd.) before and after a Taber wear test and the difference in haze value (ΔH) before and after the test was determined. For the Taber wear test, using a Taber wear testing machine (Taber® Rotary Abraser 5130 available from TABER INDUSTRIES), abrasive wheels CS-10F were allowed to rotate 1000 times at a rotational speed of 72 rpm under a load of 500 g. By the next equation, ΔH was determined and the wear resistance was evaluated based on the resulting value. The results are shown in Tables 3 and 4.

ΔH=post-test haze value−pre-test haze value (3) Evaluation Test 3:
<Transparency>

To the non-tin side (the surface touched by tin in the manufacturing process) of a glass slide (type S available from MATSUNAMIMICRO SLIDE GLASS), work fluid was sprayed and each surface-protective PSA sheet was adhered while squeezing out the work fluid with a squeeze. As the work fluid, was used a solution obtained by mixing 0.1 part by mass of product name FILM-ON (available from CP films inc.) and 99.9 parts by mass of water. The resultant was then allowed to dry at room temperature for 24 hours. Subsequently, using a haze meter (HM-100 available from Murakami Color Research Laboratory Co., Ltd.), were determined the haze value and total light transmittance. The results are shown in Tables 3 and 4.

(4) Evaluation Test 4:
<Glossiness>

To a painted plate (product name KINO 1210TW available from Kansai Paint Co., Ltd.), the work fluid was sprayed and each surface-protective PSA sheet was adhered while squeezing out the work fluid with a squeeze. The resultant was then allowed to dry at room temperature for 24 hours. Subsequently, using a micro-TRI-gloss meter (available from BYK-Gardner), the gloss was determined at a measurement angle of 20°. The results are shown in Tables 3 and 4.

(5) Evaluation Test 5:
<Dirt Resistance (1)>

To a white painted plate (standard test plate available from Nippon Testpanel Co., Ltd.), the work fluid was sprayed and each surface-protective PSA sheet was adhered while squeezing out the work fluid with a squeeze. The resultant was then allowed to dry at room temperature for 24 hours. Subsequently, using a multi-angle spectrophotometer (MA-98 available from X-Rite, Inc.), the pre-test L* value (an average of values at light-receiving angles of −15°, 15°, 25°, 45°, 75° and 110°) was determined. The results are shown in Tables 3 and 4.

Subsequently, contaminated water (JIS Z-8901-84 a 1.3/98/0.5/0.2 mixture (by mass) of 8 dust species/water/carbon black/yellow ocher) was applied to each surface-protective PSA sheet and allowed to dry at 50° C. for 10 minutes; 8 cycles of this procedure was carried out and then the contaminated water coating was cleaned off with waste cloth while applying a constant force and rinsing with water. With respect to the PSA sheet, using a multi-angle spectrophotometer, the post-test L* value was determined. The ΔL* was determined by the next equation and the dirt resistance was evaluated based on the resulting value. The results are shown in Tables 3 and 4.

$\Delta L^* = \text{pre-test } L^* \text{ value} - \text{post-test } L^* \text{ value}$ (6) Evaluation Test 6:
<Dirt Resistance (2)>

To the non-tin side of a glass slide (type S available from MATSUNAMIMICRO SLIDE GLASS), the work fluid was sprayed and each surface-protective PSA sheet was adhered while squeezing out the work fluid with a squeeze. The resultant was then allowed to dry at room temperature for 24 hours. Subsequently, using a haze meter (HM-100 available from Murakami Color Research Laboratory Co., Ltd.), were determined the pre-test haze value and total light transmittance. The results are shown in Tables 3 and 4.

Subsequently, contaminated water (JIS Z-8901-84 a 1.3/98/0.5/0.2 mixture (by mass) of 8 dust species/water/carbon black/yellow ocher) was applied to each surface-protective PSA sheet and allowed to dry at 50° C. for 10 minutes; 8 cycles of this procedure was carried out and then the contaminated water coating was cleaned off with waste cloth while applying a constant force and rinsing with water. With respect to the PSA sheet, using a haze meter, were determined the post-test haze value and total light transmittance. By the next equation, ΔH and ΔT were determined and the dirt resistance was evaluated from the resulting values. The results are shown in Tables 3 and 4.

$\Delta H = \text{post-test haze value} - \text{pre-test haze value}$ $\Delta T = \text{pre-test total light transmittance} - \text{post-test total light transmittance}$

TABLE 3

| | | Ex 1 | Ex 2 | Ex 3 | Ex 4 | Ex. 5 | Ex. 6 | Ex. 7 |
|---|---|---|---|---|---|---|---|---|
| Surface layer | Heat-curable composition | Syn. Ex 1 | Syn. Ex 2 | Syn. Ex 2 | Syn. Ex 2 | Syn. Ex. 3 | Syn. Ex. 3 | Syn. Ex. 4 |
| | Thickness | | | | 10 μm | | | |
| Resin substrate layer | Material | TPU-A | TPU-A | TPU-B | TPU-C | TPU-A | TPU-C | TPU-A |
| | Thickness | | 190 μm | | 200 μm | 190 μm | 200 μm | 190 μm |
| PSA layer | Material | | | | Acrylic PSA | | | |
| | Thickness | | | | 50 μm | | | |
| Self-repairing properties | | Good | Good | Good | Good | Good | Good | Good |
| Peel resistance | | Good | Good | Good | Good | Good | Good | Good |
| Wear resistance | ΔH | 2.0% | 4.2% | 15.5% | 13.4% | 3.1% | 6.2% | 3.0% |
| Transparency | Haze | 0.4% | 0.9% | 0.5% | 1.0% | 0.9% | 0.8% | 1.2% |
| | Total light transmittance | 91.3% | 91.3% | 91.3% | 91.2% | 91.5% | 91.3% | 91.3% |
| Glossiness | Gloss (20°) | 84.4 | 60.5 | 77.3 | 63.3 | 74.2 | 61.0 | 61.0 |
| Dirt resistance | ΔL* | 0.2 | 0.3 | 0.1 | 0.3 | 0.6 | 0.1 | 0.7 |
| | ΔH | 0.0% | 0.0% | 0.3% | 0.0% | 0.0% | 0.0% | 0.2% |
| | ΔT | 0.0% | 0.1% | 0.0% | 0.0% | 0.2% | 0.0% | 0.2% |

TPU-A: ESMER URS PX98 available from Nihon Matai Group
TPU-B: SILKLON ® SNY97-CLB available from Okura Industrial Co., Ltd.
TPU-C: ArgoGuard ® 49510-60DV available from SWM INTL

TABLE 4

| | | Ex. 8 | Ex. 9 | Ex. 10 | Ex. 11 | Ex. 12 | Ex. 13 |
|---|---|---|---|---|---|---|---|
| Surface layer | Heat-curable composition | Syn. Ex. 4 | Syn. Ex. 5 | Syn. Ex. 5 | Syn. Ex. 5 | Syn. Ex. 6 | Syn. Ex. 6 |
| | Thickness | | | 10 μm | | | |
| Resin substrate layer | Material | TPU-C | TPU-A | TPU-B | TPU-C | TPU-A | TPU-C |
| | Thickness | 200 μm | | 190 μm | 200 μm | 190 μm | 200 μm |
| PSA layer | Material | | | Acrylic PSA | | | |
| | Thickness | | | 50 μm | | | |

TABLE 4-continued

| | Ex. 8 | Ex. 9 | Ex. 10 | Ex. 11 | Ex. 12 | Ex. 13 |
|---|---|---|---|---|---|---|
| Self-repairing properties | Good | Good | Good | Good | Good | Good |
| Peel resistance | Good | Good | Good | Good | Good | Good |
| Wear resistance ΔH | 16.2% | 9.9% | 9.4% | 16.0% | 4.2% | 13.1% |
| Transparency Haze | 1.1% | 1.0% | 0.9% | 1.6% | 0.9% | 0.9% |
| Total light transmittance | 91.3% | 91.5% | 91.5% | 91.3% | 91.6% | 91.6% |
| Glossiness Gloss (20°) | 69.1 | 60.4 | 60.5 | 69.2 | 69.7 | 73.4 |
| Dirt resistance ΔL* | 0.4 | 0.3 | 0.3 | 1.0 | 0.9 | 0.8 |
| ΔH | 0.0% | 0.0% | 0.1% | 0.1% | 0.1% | 1.9% |
| ΔT | 0.0% | 0.0% | 0.0% | 0.3% | 0.4% | 6.1% |

TPU-A: ESMER URS PX98 available from Nihon Matai Group
TPU-B: SILKLON ® SNY97-CLB available from Okura Industrial Co., Ltd.
TPU-C: ArgoGuard ® 49510-60DV available from SWM INTL Industrial Applicability The surface-protective PSA sheet as an embodiment of the present invention is applied to the surface (glass surface, paint surface, resin part surface, etc.) of automobiles, construction equipment, aircrafts, watercrafts, and the like to reduce damage to the covered surface, whereby it can be used to maintain their appearance in good conditions, etc.

REFERENCE SIGNS LIST 110, 120, 130, 140 . . . surface-protective PSA sheets, 111, 121, 131, 141 . . . surface layers, 112, 122, 132, 142 . . . resin substrate layers, 113, 123, 133, 143 . . . PSA layers, 124, 144 . . . surface-layer-side middle layers, 135, 145 . . . PSA-layer-side middle layers

The invention claimed is:

1. A surface-protective pressure-sensitive adhesive sheet comprising a surface layer, a resin substrate layer and a pressure-sensitive adhesive layer, and having a multilayer structure with the resin substrate layer placed between the surface layer and the pressure-sensitive adhesive layer, wherein the surface layer is a layer obtained by curing a heat-curable composition that comprises the following components:
   (a) a hydroxyl group-containing (meth)acrylic copolymer having a glass transition temperature of −40° C. or higher and −22° C. or lower;
   (b) an allophanate polyisocyanate and/or a biuret polyisocyanate;
   (c) a polysiloxane comprising a hydroxyl group-containing hydrocarbon group and/or polymer; and
   (d) a diol having a hydroxyl value of 200 mgKOH/g or higher and a molecular weight of 500 or lower.

2. The surface-protective pressure-sensitive adhesive sheet according to claim 1, wherein the resin substrate layer comprises a thermoplastic elastomer.

3. The surface-protective pressure-sensitive adhesive sheet according to claim 1, wherein the (meth)acrylic copolymer has a hydroxyl value of 10 mgKOH/g to 150 mgKOH/g based on non-volatiles.

4. The surface-protective pressure-sensitive adhesive sheet according to claim 1, wherein the heat-curable composition has a component (a) to component (b) mass ratio (component (a)/component (b)) of 0.2 to 5.0.

* * * * *